(12) United States Patent
Fu

(10) Patent No.: US 12,256,409 B2
(45) Date of Patent: Mar. 18, 2025

(54) DATA TRANSMISSION USING UPLINK CARRIER SWITCHING METHOD

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 357 days.

(21) Appl. No.: 17/834,472

(22) Filed: Jun. 7, 2022

(65) Prior Publication Data

US 2022/0304043 A1 Sep. 22, 2022

Related U.S. Application Data

(63) Continuation of application No. PCT/CN2019/124371, filed on Dec. 10, 2019.

(51) Int. Cl.
*H04W 4/00* (2018.01)
*H04W 72/1268* (2023.01)
*H04W 72/23* (2023.01)

(52) U.S. Cl.
CPC ....... *H04W 72/23* (2023.01); *H04W 72/1268* (2013.01)

(58) Field of Classification Search
CPC .. H04W 72/23; H04W 72/1268; H04W 72/04
See application file for complete search history.

(56) References Cited

U.S. PATENT DOCUMENTS 11,553,530 B2* 1/2023 Agiwal ................ H04W 24/04
2019/0150173 A1 5/2019 Lee et al.
(Continued)

FOREIGN PATENT DOCUMENTS

CN 110267346 A 9/2019
CN 111200873 A 5/2020
(Continued)

OTHER PUBLICATIONS

International Search Report (ISR) dated Sep. 2, 2020 for Application No. PCT/CN2019/124371.
(Continued)

*Primary Examiner* — Abdelnabi O Musa
(74) *Attorney, Agent, or Firm* — Ladas & Parry LLP

(57) ABSTRACT

Embodiments of the present application provide a data transmission method and apparatus, a device, and a storage medium; and the method includes: a terminal device determines a first uplink carrier used by uplink data to be transmitted according to first information; where the first uplink carrier is a carrier of a normal uplink NUL or a carrier of a supplementary uplink SUL; and the terminal device sends the uplink data by using the first uplink carrier; where the first information is used to indicate at least one of time limit information, carrier information, resource information or service information used when selecting an uplink carrier. The method according to the embodiments of the present application can flexibly switch UL carriers or determine a carrier or a resource for uplink transmission, thereby giving the flexibility of uplink transmission to the terminal, and improving the efficiency of resource transmission.

20 Claims, 7 Drawing Sheets

(56) References Cited

U.S. PATENT DOCUMENTS

| | | | |
|---|---|---|---|
| 2019/0313343 A1 | 10/2019 | MolavianJazi et al. | |
| 2021/0068147 A1* | 3/2021 | Sato | H04W 72/04 |
| 2021/0204358 A1* | 7/2021 | Babaei | H04W 72/23 |
| 2021/0385836 A1* | 12/2021 | Ye | H04W 16/14 |
| 2022/0022250 A1* | 1/2022 | Cirik | H04W 72/542 |
| 2024/0205964 A1* | 6/2024 | Babaei | H04W 48/12 |

FOREIGN PATENT DOCUMENTS

| | | |
|---|---|---|
| EP | 3528582 A1 | 8/2019 |
| EP | 3737191 A1 | 11/2020 |
| EP | 3783959 A1 | 2/2021 |
| WO | 2019096277 A1 | 5/2019 |
| WO | 2019099361 A1 | 5/2019 |
| WO | 2019154039 A1 | 8/2019 |
| WO | 2019200591 A1 | 10/2019 |

OTHER PUBLICATIONS

The EESR of corresponding European application No. 19956116.8, dated Oct. 21, 2022.

* cited by examiner

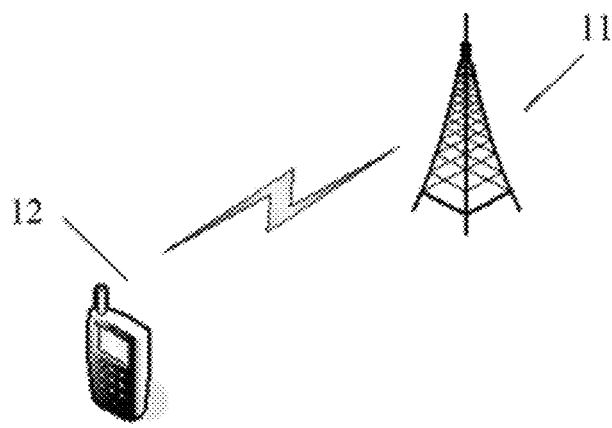

FIG. 1

A terminal device determines a first uplink carrier used by uplink data to be transmitted according to first information; where the first uplink carrier is a carrier of a normal uplink NUL or a carrier of a supplementary uplink SUL; where the first information is used to indicate at least one of time limit information, carrier information, resource information or service information used when selecting an uplink carrier — 101

The terminal device sends the uplink data by using the first uplink carrier — 102

FIG. 2

DATA TRANSMISSION USING UPLINK CARRIER SWITCHING METHOD

CROSS-REFERENCE TO RELATED APPLICATIONS

This application is a continuation of International Application No. PCT/CN2019/124371, filed on Dec. 10, 2019, which is hereby incorporated by reference in its entirety.

TECHNICAL FIELD

Embodiments of the present application relate to the field of communication technologies and, in particular, to a data transmission method, a device and a storage medium.

BACKGROUND

In order to improve uplink coverage of a high frequency band in a 5G new radio (NR) system, a supplementary uplink (SUL) is introduced. For example, a part of LTE frequency bands is used as the SUL. Because the higher the frequency band, the greater the signal transmission loss, further because an uplink power of a terminal device is limited, the uplink coverage will be limited. Therefore, using a part of the LTE frequency bands (relatively low frequency) as a supplementary uplink can improve the uplink coverage.

In related art, the terminal device determines whether to select a normal uplink (NUL) or an SUL for uplink transmission according to a reference signal received power (Reference Signal Received Power, RSRP). Specifically, if the RSRP is greater than a threshold X, the terminal device selects an NUL for uplink transmission, otherwise the terminal device selects an SUL for uplink transmission (unless indicated by dynamic scheduling, that is, if indicated to use NUL or SUL through DCI). NR-based machine-type communication (MTC) terminal devices will be introduced in future network deployment, whose application scenarios include an industrial wireless sensor network (IWSN), wearables, video surveillance, etc. The introduction of the massive number of terminal devices will have an impact on an uplink capacity of a cell. If a carrier for transmitting uplink data is only determined according to RSRP, it may lead to a heavy load of a carrier under a certain time or condition, and thus, a reasonable way of determining the carrier for uplink transmission is required.

SUMMARY

Embodiments of the present application provide a data transmission method and device, and a storage medium, so as to realize reasonable determination of a carrier for uplink transmission.

In a first aspect, an embodiment of the present application may provide a data transmission method, including:
  determining, by a terminal device, a first uplink carrier used by uplink data to be transmitted according to first information; where the first uplink carrier is a carrier of a normal uplink NUL or a carrier of a supplementary uplink SUL; and
  sending, by the terminal device, the uplink data by using the first uplink carrier, where the first information is used to indicate at least one of time limit information, carrier information, resource information or service information used when selecting an uplink carrier.

In a second aspect, an embodiment of the present application may provide a data transmission method, including:
  sending indication information; where the indication information is used to indicate to a terminal device information used when a first uplink carrier is selected; where the first uplink carrier is a carrier of an NUL or a carrier of an SUL; and
  receiving uplink data on the first uplink carrier.

In a third aspect, an embodiment of the present application may further provide a terminal device, including:
  a processing module, configured to determine a first uplink carrier used by uplink data to be transmitted according to first information; where the first uplink carrier is a carrier of a normal uplink NUL or a carrier of a supplementary uplink SUL; and
  a sending module, configured to send the uplink data by using the first uplink carrier; where the first information is used to indicate at least one of time limit information, carrier information, resource information or service information used when an uplink carrier is selected.

In a fourth aspect, an embodiment of the present application may further provide a network device, including:
  a sending module, configured to send indication information; where the indication information is used to indicate to a terminal device information used when a first uplink carrier is selected; where the first uplink carrier is a carrier of an NUL or a carrier of an SUL; and
  a receiving module, configured to receive uplink data on the first uplink carrier.

In a fifth aspect, an embodiment of the present application may further provide a terminal device, including:
  a processor, a memory, and an interface for communicating with another device; where
  the memory stores computer-executable instructions; and
  the processor executes the computer-executable instructions stored in the memory to cause the processor to execute the data transmission method provided in the first aspect.

In a sixth aspect, an embodiment of the present application may further provide a network device, including:
  a processor, a memory, and an interface for communicating with another device; where
  the memory stores computer-executable instructions;
  the processor executes the computer-executable instructions stored in the memory to cause the processor to execute the data transmission method provided in the second aspect.

In a seventh aspect, an embodiment of the present application provides a computer-readable storage medium, where the computer-readable storage medium stores computer-executable instructions, and the computer-executable instructions, when executed by a processor, are used to implement the data transmission method according to the first aspect.

In an eighth aspect, an embodiment of the present application provides a computer-readable storage medium, where the computer-readable storage medium stores computer-executable instructions, and the computer-executable instructions, when executed by a processor, are used to implement the data transmission method according to the second aspect.

In a ninth aspect, an embodiment of the present application provides a program, where the program, when executed by a processor, is used to execute the data transmission method according to the first aspect.

In an implementation, the above processor may be a chip.

In a tenth aspect, an embodiment of the present application provides a program, where the program, when executed by a processor, is used to execute the data transmission method according to the second aspect.

In an implementation, the above processor may be a chip.

In an eleventh aspect, an embodiment of the present application provides a computer program product, including program instructions, where the program instructions are used to implement the data transmission method according to the first aspect.

In a twelfth aspect, an embodiment of the present application provides a computer program product, including program instructions, where the program instructions are used to implement the data transmission method according to the second aspect.

In a thirteenth aspect, an embodiment of the present application provides a chip, including a processing module and a communication interface, where the processing module can execute the data transmission method according to the first aspect.

Furthermore, the chip further includes a storage module (such as a memory), the storage module is configured to store instructions, the processing module is configured to execute the instructions stored in the storage module, and the execution of the instructions stored in the storage module causes the processing module to execute the data transmission method according to the first aspect.

In a fourteenth aspect, an embodiment of the present application provides a chip, including a processing module and a communication interface, where the processing module can execute the data transmission method according to the second aspect.

Furthermore, the chip further includes a storage module (such as a memory), the storage module is configured to store instructions, the processing module is configured to execute the instructions stored in the storage module, and the execution of the instructions stored in the storage module causes the processing module to execute the data transmission method according to the second aspect.

In the data transmission method and device, and the storage medium provided in the embodiments of the present application, the terminal device determines a first uplink carrier used by uplink data to be transmitted according to first information; where the first uplink carrier is a carrier of a normal uplink NUL or a carrier of a supplementary uplink SUL; and the terminal device sends the uplink data by using the first uplink carrier, where the first information is used to indicate at least one of time limit information, carrier information, resource information or service information used when selecting an uplink carrier. The terminal device can flexibly switch UL carriers and determine a carrier or a resource for uplink transmission, thereby giving the terminal the flexibility of uplink transmission, improving the transmission efficiency of resources, and alleviating the problem of limited PUSCH resource capacity to some extent.

BRIEF DESCRIPTION OF THE DRAWINGS

In order to more clearly describe the technical solution in embodiments of the present application or the prior art, the following will briefly introduce the drawings that need to be used in the description of the embodiments or the prior art. Apparently, the drawings in the following description are a part of embodiments of the present application. For the persons of ordinary skill in the art, other drawings can also be obtained based on these drawings without creative labor.

FIG. 1 is a schematic diagram of a communication system to which an embodiment of the application is applied;

FIG. 2 is a flowchart of an embodiment of a data transmission method provided by the present application;

DESCRIPTION OF EMBODIMENTS

Figure 3:
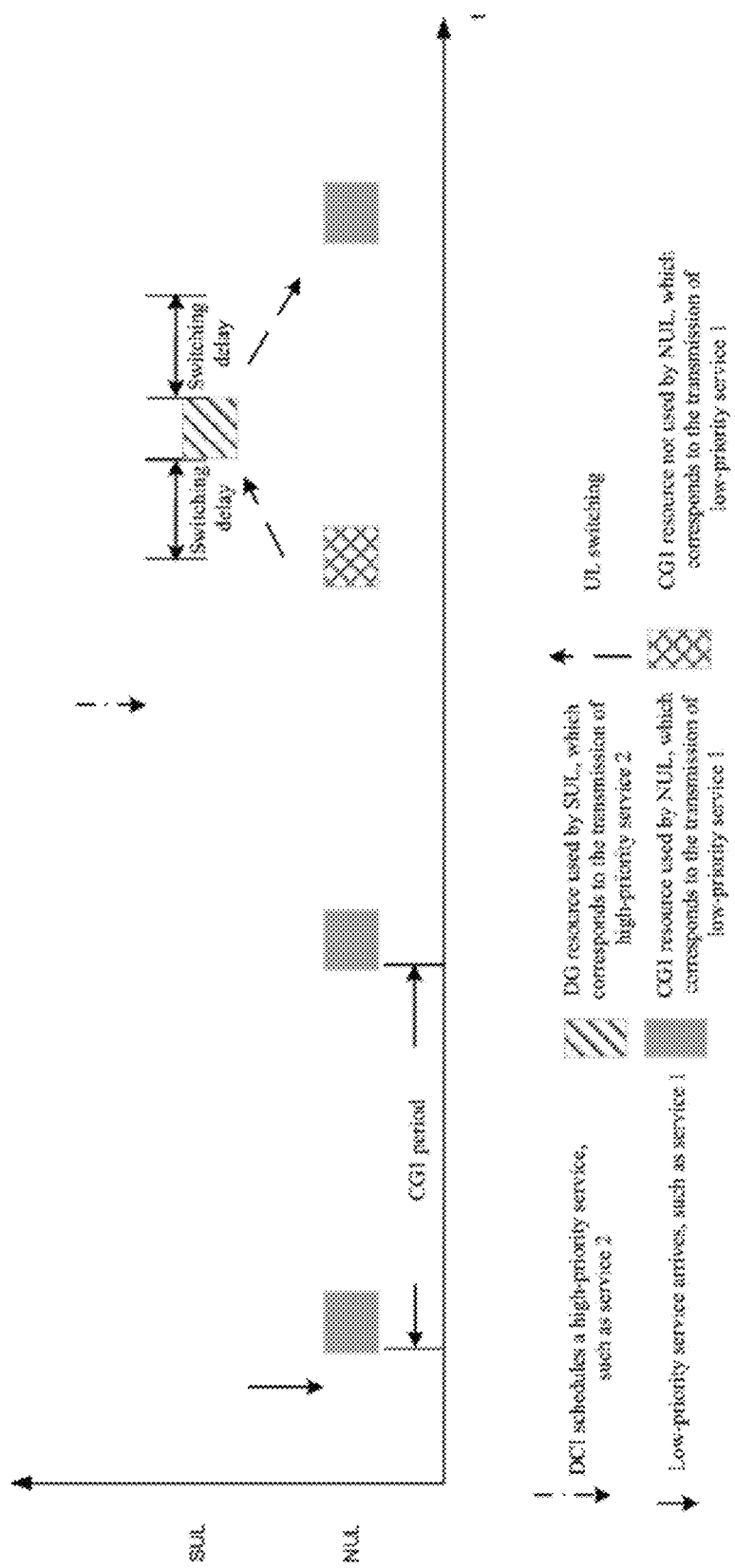
FIG. 3 is a schematic diagram of a switching principle according to an embodiment of the method provided by the present application.

In order to make the purpose, the technical solution, and the advantage of embodiments of the present application clearer, the technical solution in embodiments of the present application will be clearly and completely described below with reference to the accompanying drawings. Apparently, the described embodiments are merely a part rather than all embodiments of the present application. All other embodiments obtained by persons of ordinary skill in the art based on embodiments in the present application without paying creative labor shall fall within the protection scope of the present application.

The terms "first", "second", etc. in the description, claims, and the aforementioned drawings of the embodiments of the present application are used to distinguish similar objects, and are not used to describe a specific order or sequence. It should be understood that data used in this way can be interchanged under appropriate circumstances, so that the embodiments of the present application described herein may be implemented, for example, in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to these process, method, product, or device.

At present, with pursuits of speed, latency, high-speed mobility and energy efficiency from people, and a diversity and complexity of services in future life, the 3GPP international standards organization has begun to develop 5G. Main application scenarios of 5G include: enhanced mobile ultra-broadband (eMBB), low latency and high reliability communication (URLLC), and massive machine type communication (mMTC).

A 5G NR system may also be deployed independently. In 5G network environment, a new radio resource control (RRC) state, that is, an RRC_INACTIVE state, is defined for the purpose of reducing air interface signaling and quickly restoring a radio connection and quickly restoring a data service, and this state is different from an RRC_IDLE state and an RRC ACTIVE states.

The RRC_IDLE state means: a mobility is based on terminal device cell selection and reselection, paging is initiated by a core network (CN), and a paging area is configured by the CN. A terminal device access stratum (AS) context is not stored on the network device side, and an RRC connection does not exist.

The RRC_CONNECTED state means: an RRC connection exists, and a terminal device AS context is stored on the network device and the terminal device. The network side knows a location of the terminal device which is at a specific cell level. The mobility is a mobility controlled by the network side. Unicast data may be transmitted between the terminal device and the network device.

The RRC_INACTIVE state means: a mobility is based on terminal device cell selection and reselection, a connection between CN-NR exists, a terminal device AS context is stored on a certain base station, a paging is triggered by a radio access network (RAN), the RAN-based paging area is managed by the RAN, and the network side knows a location of the terminal device which is based on a RAN-based paging area level.

NR-light devices were introduced into the NR system in 3GPP R17. At present, the NR-light devices mainly include the following three scenarios:

Industrial wireless sensors: compared with URLLC, the industrial wireless sensors have relatively low requirements for latency and reliability. At the same time, the cost and power consumption of the industrial wireless sensors are lower than URLLC and eMBB.

Video surveillance, which is mainly used for video surveillance in a smart city, an industrial factory, etc. Data collection and processing in the smart city facilitates more effective monitoring and control of urban resources and provides more effective services to urban residents.

Wearables, which include a smart watch, an electronic health device, and some medical monitoring devices. A commonality of these devices is a small size device.

Common requirements for the above three scenarios:
Device cost: compared with R15/16 eMBB, lower device cost and complexity are required. A basic consensus is to reduce bandwidth and receiving antennas.
Device size: a relatively small device size.
Coverage: it is required to achieve coverage equivalent to R15/16 eMBB. If a coverage loss is caused by reducing receiving antennas, reducing bandwidth, reducing a power level or other reducing the complexity of a terminal device, it needs to be compensated.

For the above three scenarios, there is another point, that is, different scenarios have different requirements.
Industrial wireless sensors: reliability is 99.99%, and end-to-end latency is 100 ms. A bit rate requirement is 2 Mbps. The device is stationary. A battery life is a few years. For a safety-related sensor, a latency requirement is 5-10 ms.
Video surveillance: a bit rate requirement is 2-4 Mbps, a latency requirement is <500 ms, a reliability requirement is 99.0%-99.9%. For some upscale video, a rate is 2-4 Mbps. There is a relatively large amount of uplink traffic.
Wearables: reference is made to LTE category Cat 4, a rate is 150 Mbpsi50 Mbps.

In order to improve an uplink coverage of a high frequency band in a 5G new radio NR system, a supplementary uplink SUL is introduced. For example, some of LTE frequency bands are used as the SUL.

The SUL, an NUL and a downlink (DL) belong to a same cell, and at a same time, there exists at most one physical uplink shared channel (PUSCH) which is transmitting; unless a network side explicitly instructs a terminal device to use which UL, the terminal device decides a selection of the UL according to a measurement threshold. The threshold is broadcast and configured in a system broadcast. Carriers of two ULs (two ULs, namely an SUL and an NUL) may be dynamically switched through DCI indication.

For the RRC_IDLE state or the RRC_INACTIVE state, whether to use an NUL or an SUL for initial access is determined according to an RSRP value of a serving cell.

NR-based MTC terminals will be introduced in future network deployment, whose application scenarios include an industrial sensor network, wearables, video surveillance, etc. The introduction of the large number of terminals will have an impact on an uplink capacity of a cell. For example, in order to improve the uplink capacity of the cell, a scenario is designed, which includes an NUL and at least one SUL. At this time, determining a carrier for transmitting uplink data only according to an RSRP may lead to a heavy load of the carrier under a certain time or condition, and some SUL carriers may not be selected, so that a reasonable way of determining the carrier for uplink transmission is required.

The terminal device performs data transmission using a UL grant resource. The UL grant resource may include: a dynamic grant (DG) resource, and may also be a configured grant (CG) resource. The network side schedules the DG resource through dynamic downlink control information (DCI), and configures the CG resource through high-layer signaling (such as, RRC). Currently, there are two types of CG resources: a type1 CG resource (which may be used after configured by RRC) and a type2 CG resource (which may be used after configured by RRC and activated by DCI).

In Rel-15, the type1 CG resource may only be configured on SUL or NUL, that is, two ULs cannot be configured with type1 CG resources at the same time, which is similar for the type2 CG resource. In addition, only the type1 CG resource or the type2 CG resource is configured on a serving cell, that is, the type1 CG resource and the type2 CG resource cannot be configured at the same time. However, in Rel-16, this limitation is broken, that is, one bandwidth part (BWP) of one serving cell may be configured with the type1 CG resource and the type2 CG resource at the same time. That is, there is no problem of CG resource transmission switching in the prior art. However, this limitation is broken currently. Since both the NUL and the SUL may be configured with CG resources (for example, the NUL is configured with a type1 CG resource, and the SUL is configured with a type2 CG resource), a problem of CG transmission switching is involved, as well as a problem of whether the CG of an original carrier can still be transmitted after switching.

The communication method provided by the present application will be described in the following.

FIG. 1 is a schematic diagram of a communication system to which an embodiment of the present application is applied. As shown in FIG. 1, the communication system includes at least a network device 11 and a terminal device 12. It can be understood that, in an actual communication system, there may be one or more network devices 11 and one or more terminal devices 12, and FIG. 1 only takes one as an example.

In FIG. 1, the network device 11 may be an access network device, for example, may be an access device in an LT network and its evolved network, such as an evolutional node B (eNB or eNodeB), or may further include a next generation node B (gNB) in a 50 NR system, or a relay station, or a base station in a new network system in the future, etc.

The terminal device 12 may also be referred to as a mobile terminal, user equipment (UE), an access terminal, a user unit, a user station, a mobile station, a mobile platform, a user terminal, a terminal, a wireless communication device, a user agent or a user apparatus. Specifically, it may be a smart phone, a cellular phone, a cordless phone, a personal digital assistant (PDA) device, a handheld device with wireless communication function or another processing device connected to a wireless modem, a vehicle-mounted device, a wearable, etc. In embodiments of the present application, the terminal device has an interface for communicating with a network device.

In the following embodiments of the present application, carrier switching is used as an example for description, where the carrier may also be replaced with a frequency point, which is not limited in the present application, and the implementation principles are similar.

FIG. 2 is a flowchart of an embodiment of a data transmission method provided by the present application. As shown in FIG. 2, specific implementation steps of this embodiment include:

Step 101, a terminal device determines a first uplink carrier used by uplink data to be transmitted according to first information; where the first uplink carrier is a carrier of a normal uplink NUL or a carrier of a supplementary uplink SUL: where the first information is used to indicate at least one of time limit information, carrier information, resource information or service information used when selecting an uplink carrier.

The method of this embodiment of the present application may be in a scenario where the terminal device is configured with an NUL and at least one SUL, and the terminal device may perform uplink transmission with a network device through carriers of the NUL and the at least one SUL.

In an embodiment, the carrier information of one or more SULs may be indicated through a system message broadcast (such as system information block (SIB) 1) of a serving cell; the carrier or resource information of the NUL may also be indicated.

In an embodiment, the serving cell may also broadcast preference parameter information of carriers of the NUL and the at least one SUL, or broadcast preference parameter information of transmission resources on carriers of the NUL and the at least one SUL, where the preference parameter information includes, for example, information about a priority and/or a selection factor, where the priority may be configured or indicated by the network, determined by the selection factor, or preset.

Each NUL or SUL has a respective preference parameter, and any of the following manners may be used.

One manner: respective preference parameters corresponding to the NUL and the SUL are the same; that is, the NUL and the SUL adopt the same priority or selection factor. For example, for 1 NUL and 3 SULs, the priority or selection factor for each NUL or SUL is the same, which is 0.25.

Another manner: the preference parameter corresponding to NUL is a first parameter a, and the preference parameter corresponding to each of the at least one SUL is $(1-a)/n$, where n is the number of the at least one SUL, specifically, the NUL adopts the priority or selection factor a, and SULs equally share the remaining priority or selection factor, for example $(1-a)/n$, where n is the total number of the at least one SUL.

Another manner: each NUL or SUL has its own priority or selection factor, and the respective priority or selection factor may be the same or different, for example, the priorities or selection factors of NUL and 3 SULs are {a, b, c, d}.

In other embodiments, the carrier information of the NUL and the SUL and the preference parameter information of carriers of the NUL and the SUL may also be predefined.

In an embodiment, the serving cell configures the terminal device with a resource for transmitting uplink data, such as a CG resource. Any one of the following configuration manners may be used.

One manner: both the NUL and the SUL are configured with a CG resource, and types of configured CG resources are different. For example, the NUL is configured with a type1 CG resource, and the SUL is configured with a type2 CG resource, where it is also possible to configure a CG resource for each of the at least one SUL, or configure a CG recourse for some of the at least one SUL.

Another manner: both the NUL and the SUL are configured with a CG resource, and CG resources configured are of the same type. For example, both the NUL and the SUL are configured with a type1 CG resource, where it is also possible to configure a CG resource for all or some of the at least one SUL. or, both the NUL and the SUL are configured with a type1 CG resources and a type2 CG resource. For example, the NUL is configured with a type1 CG resource and a type2 CG resource, and one SUL is configured with a type1 CG resource and a type2 CG resource; or, the NUL is configured with a type1 CG resource and a type2 CG resource, and multiple SULs are configured with a type1 CG resource and a type2 CG resource.

Yet another manner: the NUL is configured with a CG resource and one of the SUL is configured with a CG resource. For example, only one type of UL in the NUL and the SUL is configured with a CG resource. For example, the NUL is configured with a CG resource, while the SUL is not configured with a CG resource, or, the SUL is configured with a CG resource (which may be that part of the SUL is configured with a CG resource or all of the SUL may be configured with a CG resource), while the NUL is not configured with a CG resource.

In another embodiment, a corresponding preference parameter, such as a priority (high or low), or a priority level (1, 2, 3, 4, etc.), and/or, a selection factor, may also be configured for the CG resources configured on the NUL and the SUL. For example, the configuration is conducted by indication information from the network side. The selection factor may be used to determine the priority.

In an embodiment, information about a carrier or a resource may be configured to the terminal device through higher layer signaling.

In another embodiment, resources of the NUL and the SUL, as well as the preference parameters corresponding to the resources, may also be predefined.

The first information may be information that the terminal device side needs to refer to when determining a carrier for transmitting uplink data, where the first information is used to indicate at least one of time limit information, carrier information, resource information or service information used when selecting an uplink carrier, which includes, for example, indication information from a network side, information determined by the terminal device side, information configured in advance for the terminal device by the network side, or predefined information, etc.

In an embodiment, the time limit information includes at least one of the following:
- a switching delay required for the terminal device to switch from a second uplink carrier currently used to another carrier of the SUL or the NUL; or
- a preset duration, where a time interval between two adjacent times of carrier switching is not allowed to be less than or equal to the preset duration.

In an embodiment, the carrier information includes at least one of the following:
- a state of carrier, where the state is an active state or an inactive state;
- a preference parameter of carrier:
- carrier identifier information for switching; or
- information about a first to-be-switched carrier indicated by a network side.

In an embodiment, the resource information includes at least one of the following:
- a state of resource, where the state is an active state or an inactive state;
- a preference parameter of resource; or
- resource information corresponding to a first to-be-switched carrier indicated by a network side.

In an embodiment, the service information includes a service priority corresponding to uplink data transmitted on a carrier or a resource.

The first information may include at least one of the following:
- a switching time required for the terminal device to switch from a second uplink carrier currently used to another carrier of the SUL or the NUL;
- a preset duration, where a time interval between two adjacent times of carrier switching is not allowed to be less than or equal to the preset duration;
- a preference parameter of resource;
- a state of carrier or resource, where the state is an active state or an inactive state;
- a preference parameter of carrier.
- a service priority corresponding to uplink data transmitted on a carrier or a resource;
- carrier identifier information for switching; or
- information about a first to-be-switched carrier indicated by a network side; or resource information corresponding to the first to-be-switched carrier indicated by the network side.

The above-mentioned carrier is a carrier of the NUL or the SUL, and the resource is a resource of the NUL or the SUL.

The switching delay may be configured by the network, predefined, or determined by the terminal device.

Switching delays of the terminal device and other terminal devices may be the same or different, and switching delay of the other terminal devices may be the same or different.

In an embodiment, switching delays of different types of terminal devices may be different, and switching delays of the same type of terminal devices may be the same.

The switching delay includes a switching delay for a radio frequency RF link, or may further includes a time for preparing a resource or other times, etc.

Switching delays for the terminal device to switch from an uplink carrier of the NUL to an uplink carrier of the SUL, switch from an uplink carrier of the SUL to another uplink carrier of the SUL, and switch from an uplink carrier of the SUL to an uplink carrier of the NUL are the same or different.

The preset duration may be configured, predefined, or determined by the terminal device.

The first to-be-switched carrier indicated by the network side is indicated by, for example, indication information sent by the network device, where the indication information may include at least one of the following: a first switching identifier, an identifier of the first to-be-switched carrier, resource information of the first to-be-switched carrier.

The priority of resource refers to, for example, high/low-priority resources or resources for transmitting high/low-priority services: if a resource of an uplink carrier is a high-priority resource, the terminal device may preferentially select the resource for uplink transmission. The resource include, for example, a CG resource and a DG resource.

The service priority refers to, for example, high/low-priority services and services with high/low quality of service (QoS).

The priority of resource, the preference parameter of carrier, the priority of service, etc. may be configured to the terminal device through the network device, or predefined.

The carrier identifier information for switching may be configured by the network, predefined, or determined by the terminal device. The carrier identifier information is used to, for example, indicate a specific UL carrier, for example, selecting a carrier of the NUL as the first uplink carrier, or selecting a carrier from some carriers with specific identifiers, or selecting a carrier with a smallest or largest carrier identifier.

Step 102: The terminal device sends the uplink data by using the first uplink carrier.

The terminal device may switch from the second uplink carrier to the first uplink carrier and sends the uplink data by using the first uplink carrier if the first uplink carrier is different from the second uplink carrier currently used;

the terminal device continues to transmit uplink data on the second uplink carrier if the first uplink carrier is the same as the second uplink carrier.

That is, the terminal device remains on the second uplink carrier currently used to transmit uplink data when the first uplink carrier is the second uplink carrier, that is, the original second uplink carrier is still used to transmit uplink data.

In an embodiment, the terminal device determines the second uplink carrier currently used according to second information; where the second information includes at least one of the following: preference parameters of resource in the NUL and/or the SUL, preference parameters of carrier of the NUL and the SUL, a reference signal received power (RSRP), a reference signal received quality (RSRQ), or second indication information sent by a network device; the second indication information is used to indicate initial carrier information, or to indicate information about the first uplink carrier. Among them, the second indication information may further include at least one of the following: a carrier identifier, or a valid time for using a carrier.

An initial carrier may be a carrier used by the terminal device to initially send uplink data, and the initial carrier may be the second uplink carrier or another carrier of the NUL or the SUL. That is, the second indication information may further indicate information of a current to-be-used carrier.

In an embodiment, the method may further include:
receiving fourth indication information, where the fourth indication information is used to configure whether the terminal device is allowed to switch carriers.

Specifically, the network side may configure the terminal device whether the terminal device can autonomously select a carrier for switching, that is, a characteristic of the terminal for selecting or switching a carrier is configurable.

In the method of this embodiment, the uplink capacity may be increased in a case of multiple SULs, that is, for multiple terminal devices, the total number of ULs which can be selected increases. The terminal device may switch UL carriers flexibly, and determine a carrier or a resource for uplink transmission flexibly, and thereby, the terminal is given the flexibility of uplink transmission, the efficiency of resource transmission is improved, and the problem of limited PUSCH resource capacity is alleviated to some extent.

Assuming that the carrier currently used by the terminal device for uplink transmission is the second uplink carrier, the first uplink carrier may be determined in accordance with different contents of the first information in the following manners:

Manner 1:

If the first information includes information about a first to-be-switched carrier indicated by the network side or resource information corresponding to the first to-be-switched carrier indicated by the network side, that is, the terminal device receives indication information of the network device, where the indication information includes at least one of the following: a first switching identifier, an identifier of the first to-be-switched carrier, a resource of the first to-be-switched carrier, such as a dynamic resource; step 101 may be specifically implemented in the following manner:
the terminal device takes the first to-be-switched carrier as the first uplink carrier.

Specifically, the terminal device may select a carrier for uplink transmission according to an indication from the network device, and take the first to-be-switched carrier as the first uplink carrier, and if the first to-be-switched carrier is different from the second uplink carrier currently used, performs carrier switching to switch the second uplink carrier to the first uplink carrier.

For example, if the second uplink carrier currently used is a carrier of an SUL, the first to-be-switched carrier may be a carried of the NUL or a carrier of another SUL, or if the second uplink carrier currently used is a carrier of the NUL, the first to-be-switched carrier may be a carrier of an SUL.

Manner 2:

If the first information includes the switching delay; that is, a switching delay required to switch from the second uplink carrier currently used to another carrier of the NUL or the SUL, that is, another carrier, except the second uplink carrier, in the carrier of the SUL or the NUL; which may be implemented in the following manners:

Manner 2-1:

Before step 101, the method further includes:
the terminal device receives first indication information, where the first indication information includes a start time of a resource of a second to-be-switched carrier; the first indication information may further include at least one of the following: a second switching identifier, or an identifier of the second to-be-switched carrier, where the first indication information may be DC information;

and step 101 specifically includes:
the terminal device determines whether to take the second to-be-switched carrier as the first uplink carrier according to the start time of the resource of the second to-be-switched carrier included in the first indication information and the switching delay included in the first information.

That is, in the manner 2-1, it is necessary to determine whether to switch the carrier through information about the carrier indicated by the network device.

For example, if the second uplink carrier currently used is a carrier of an SUL, the second to-be-switched carrier may be a carrier of the NUL or a carrier of another SUL, or if the second uplink carrier currently used is a carrier of the NUL, and the second to-be-switched carrier may be a carrier of an SUL.

The terminal device determines whether to take the second to-be-switched carrier as the first uplink carrier according to the start time of the resource of the second to-be-switched carrier and the switching delay, which may be implemented in the following manner:
the terminal device takes the second to-be-switched carrier as the first uplink carrier if a time difference between the start time of the resource of the second to-be-switched carrier and a start time of a resource of the second uplink carrier is greater than the switching delay;
or,
the terminal device takes the second to-be-switched carrier as the first uplink carrier if a time difference between a reception time or a solution time of the first indication information and the start time of the resource of the second to-be-switched carrier is greater than the switching delay.

Illustratively, when the second uplink carrier currently used by the terminal device is a carrier of the NUL, for example when a CG resource (or a DG resource) of the NUL is used to transmit data, if an indication of the network device to perform uplink transmission on other SUL is received, the terminal device switches to the SUL to use a CG resource or a DG resource to transmit uplink data if a time difference between a start time of the CG resource of the NUL and the CG resource or the DG resource of the SUL is greater than the switching delay, otherwise the terminal device still remains on the NUL to transmit.

Illustratively, when the second uplink carrier currently used by the terminal device is a carrier of the NUL, for example, an activated CG resource (or DG resource) is configured on the NUL, if an indication of the network device to perform uplink transmission on other SUL is received, the terminal device switches to the SUL to use a CG resource or a DG resource to transmit uplink data if a time difference between a reception time or a solution time of the first indication information and a start time of a resource of the SUL is greater than the switching delay; otherwise, the terminal device still remains on the NUL to transmit. In another embodiment, if the second uplink carrier currently used by the terminal device is a carrier of an SUL, and if an indication of the network device to perform uplink transmission in the NUL or another SUL is received, the situation is similar to the above.

Furthermore, after determining that it is possible to switch from the second uplink carrier to the first uplink carrier, the terminal device may switch from the second uplink carrier to the first uplink carrier no later than a time moment N-K;
or, step 102 includes:
the terminal device sends the uplink data by using the first uplink carrier no later than the time moment N-K;
where N is a start time of a resource of the first uplink carrier, and K is the switching delay.

Illustratively, when the second uplink carrier currently used by the terminal device is a carrier of the NUL, for example, an activated CG resource is configured on the NUL, if indication information for uplink transmission on other SUL is received, the terminal device may first continue to transmit uplink data by using the CG resource of the NUL and switch from the NUL to the SUL no later than the time moment N-K, or transmit uplink data by using a resource of the SUL no later than the time moment N-K. The resource of the SUL may be a CG resource or a DG resource. Alternatively, the current resource of the NUL may also be a DG resource.

Manner 2-2:

The terminal device takes a carrier of an SUL as the first uplink carrier if a time difference between a start time of a configured grant CG resource of the NUL and a start time of a CG resource of the SUL is greater than or equal to the switching delay, and the second uplink carrier is a carrier of the NUL;
the terminal device takes a carrier of the NUL as the first uplink carrier if a time difference between a start time of a CG resource of the NUL and a start time of a CG resource of the SUL is greater than or equal to the switching delay, and the second uplink carrier is a carrier of the SUL.

In the manner 2-2, indication of the network side may not be required, and the terminal device determines the first uplink carrier independently.

Illustratively, both the NUL and the SUL have a configured and activated CG resource. When the second uplink carrier currently used by the terminal device is a carrier of the NUL and a CG resource is used to transmit uplink data, the terminal device switches to the SUL to use the CO resource for transmission if a time difference between the CO resource on the SUL and the CG resource on the NUL is greater than the switching delay; otherwise, the terminal device still continues to transmit uplink data on the NUL.

Illustratively, both the NUL and the SUL have a configured and activated CG resource. When the second uplink carrier currently used by the terminal device is a carrier of the SUL and a CG resource is used to transmit uplink data, the terminal device switches to the NUL to use a CG resource for transmission if a time difference between the CG resource on the SUL and the CG resource on the NUL is greater than the switching delay: otherwise, the terminal device still continues to transmit uplink data on the SUL.

In the manner 2, other information may be further considered during switching, such as, a preference parameter of carrier, a preference parameter of resource, a service priority, a preset duration, a state of carrier or resource, etc.

Manner 3:

If the first information includes the preset duration, step 101 may be specifically implemented in the following manner:
the terminal device takes the second uplink carrier currently used as the first uplink carrier if the terminal device determines that a time interval between a current time and a time of latest carrier switching is less than the preset duration.

Specifically, a time when the terminal device performs carrier switching is recorded, and carrier switching is not performed if an interval between the current time and a time of the latest carrier switching is less than the preset duration, that is, the current second uplink carrier is retained to transmit uplink data.

If the interval is greater than or equal to the preset duration, carrier switching may be performed.

In an embodiment, the preset duration refers to a duration in which carrier switching or active carrier switching cannot be performed after the terminal device performs carrier switching. In the case where active carrier switching cannot be performed, if an indication of the network device is received, switching may be performed, which is not limited by the preset duration.

The preset duration may be configured, predefined, or determined by the terminal device.

In an embodiment, control of the time interval of carrier switching may be implemented in the form of a timer. For example, after switching or after receiving a switching indication of the network side, the timer is started. The carrier may be switched after the timer expires. Furthermore, during the running of the timer, if a carrier switching indication of the network side is received, carrier switching is performed, otherwise carrier switching is not performed.

In the manner 3, other information may be further considered during switching, such as a switching delay, a preference parameter of carrier, a preference parameter of resource, a service priority, a state of carrier or resource, etc.

Manner 4:

If the first information includes the preference parameter of resource, and the preference parameter including a priority and/or a selection factor, then step 101 may be specifically implemented in the following manner:
if there exists in the NUL and the SUL at least one third uplink carrier of which a preference parameter of resource is higher than a preference parameter of resource of the second uplink carrier, the terminal device selects the first uplink carrier from the at least one third uplink carrier.

If a resource of a UL carrier is a resource with a high preference parameter, the terminal device selects the resource for uplink transmission preferentially.

Illustratively, if both the NUL and the SUL have a configured and activated CG resource, and a priority of the CG resource of the NUL is higher, the terminal device preferentially selects the CG resource of the NUL to transmit uplink data in any case, such as, where CG resources of the NUL and the SUL conflict (for example, where a CG resource is currently used for transmission, but an indication to use a DG resource for transmission is received from the network, or the priority of carrier is not satisfied, etc.), or the second uplink carrier currently used by the terminal device is a carrier of the SUL, or a time difference between start times of CG resources of the SUL and the NUL is less than the switching delay.

Furthermore, if a low-priority resource is transmitting, the terminal device may directly switch to a high-priority resource to transmit uplink data without waiting for completion of transmission of the low-priority resource.

The manner 4 is also applicable to switching between a CG resource and a DG resource, or switching between a DG resource and another DG resource, where a resource of the SUL is a CG resource, and a resource of the NUL is a DG resource; or, resources of the NUL and the SUL are both DG resources; or, a resource of the NUL is a CG resource, and a resource of the SUL is a DG resource; or, resources of the NUL and the SUL are both CG resources.

In an embodiment, the manner 4 may specifically select the first uplink carrier in the following manners:

if the second uplink carrier belongs to the SUL, and a preference parameter of resource of the NUL is higher than a preference parameter of resource of the SUL, the at least one third uplink carrier is a carrier of the NUL; or if the second uplink carrier belongs to the SUL, and a preference parameter of resource of another SUL except the second uplink carrier in the SUL is higher than a preference parameter of resource of the second uplink carrier, the at least one third uplink carrier is a carrier of the another SUL; or if the second uplink carrier belongs to the NUL, and a preference parameter of resource of the SUL is higher than a preference parameter of resource of the NUL, the at least one third uplink carrier is a carrier of the SUL; or the terminal device selecting the first uplink carrier from the at least one third uplink carrier includes:

if the at least one third uplink carrier includes a carrier of the NUL, selecting the carrier of the NUL from the at least one third uplink carrier as the first uplink carrier; or taking a carrier with a smallest carrier identifier in the at least one third uplink carrier as the first uplink carrier; or taking a carrier with a specific carrier identifier in the at least one third uplink carrier as the first uplink carrier.

Specifically, if a preference parameter of resource of the NUL is higher than a preference parameter of resource of the SUL, a carrier of the NUL with a preference parameter higher than that of the second uplink carrier may be selected as the first uplink carrier;

if a preference parameter of resource of a carrier of another SUL except the second uplink carrier in the SUL is higher than a preference parameter of resource of the second uplink carrier, the first uplink carrier may be selected from the carrier of the another SUL.

If the second uplink carrier belongs to the NUL, and a preference parameter of resource of the SUL is higher than a preference parameter of resource of the NUL, the first uplink carrier may be selected from a carrier of the SUL.

If the at least one third uplink carrier includes a carrier of the NUL, the carrier of the NUL may be selected as the first uplink carrier preferentially; or, a carrier with a smallest carrier identifier in the at least one third uplink carrier is taken as the first uplink carrier; or, a carrier with a specific identifier in the at least one third uplink carrier is taken as the first uplink carrier.

In the manner 4, other information may be further considered during switching, such as a switching delay, a preference parameter of carrier, a service priority, a state of carrier or resource, etc.

A resource of at least one third uplink carrier is a dynamic grant DG resource, and a resource of the second uplink carrier is a CG resource.

That is, it may be pre-defined or configured that a preference parameter of a DG resource is higher than a preference parameter of a CG resource.

In any case, such as, where resources of carriers of different ULs conflict, or the second uplink carrier currently used by the terminal device is not a carrier for transmitting a DG resource, or a time difference between a start time of a DG resource of a non-currently used carrier and a start time of a CG resource of the second uplink carrier currently used is smaller than the switching delay, the terminal device preferentially selects a DG resource to transmit uplink data.

Manner 5:

If the first information includes: the state of carrier; step 101 may be specifically implemented in the following manner:

if there exists in the NUL and the SUL at least one fourth uplink carrier of which a state is the active state, the terminal device selects the first uplink carrier from the at least one fourth uplink carrier.

If the first information includes: the state of resource; step 101 may be specifically implemented in the following manner:

if there exists in the NUL and the SUL at least one first resource of which a state is the active state, the terminal device selects the first uplink carrier from an uplink carrier corresponding to the at least one first resource.

In the manner 5, a carrier or a resource on a carrier in the active state is a carrier or a resource which may be selected for uplink transmission.

Among them, a resource of the at least one fourth uplink carrier is a CG resource; or the at least one first resource is a CG resource, that is, only a configured and activated CG resource is a resource which may be selected for uplink transmission.

In the manner 5, other information may be further considered during switching, such as a switching delay, a preference parameter of resource, a preference parameter of carrier, a service priority, etc.

Manner 6:

The first information includes the preference parameter of carrier, the preference parameter including a priority and/or a selection factor, step 101 may be specifically implemented in the following manner:

if there exists in the NUL and the SUL at least one fifth uplink carrier of which a preference parameter is higher than a preference parameter of the second uplink carrier, selecting the first uplink carrier from the at least one fifth uplink carrier.

Specifically, the terminal device may select a resource of a carrier with a higher priority or a higher selection factor for transmission preferentially.

In an embodiment, the first uplink carrier may be determined in the following manners:

if the second uplink carrier belongs to the SUL, and a preference parameter of carrier of the NUL is higher than a preference parameter of carrier of the SUL, the at least one fifth uplink carrier is a carrier of the NUL; or if the second uplink carrier belongs to the NUL, and a preference parameter of carrier of the SUL is higher than a preference parameter of carrier of the NUL, the at least one fifth uplink carrier is a carrier of the SUL; or if the second uplink carrier belongs to the SUL, and a preference parameter of carrier of another SUL except the second uplink carrier in the SUL is higher than a preference parameter of the second uplink carrier, the at least one fifth uplink carrier is a carrier of the another SUL.

Illustratively, if a priority of a carrier of the NUL is higher, in any cases, such as, where resources of the NUL and the SUL conflict, or the second uplink carrier currently used by the terminal is a carrier of the SUL, or a time difference between start times of a resource of the SUL and a resource of the NUL is smaller than the switching delay, the terminal device preferentially selects a resource of the carrier of the NUL to transmit uplink data.

Furthermore, if a resource of a low-priority carrier is transmitting uplink data, the terminal device may directly switch to a resource of a high-priority carrier to transmit uplink data without waiting for completion of transmission of the resource of the low-priority carrier.

The manner 6 is also applicable to switching between a CG resource and a DG resource, or switching between a DG resource and another DG resource, where a resource of the SUL is a CG resource, and a resource of the NUL is a DG resource; or, resources of the NUL and the SUL are both DG resources; or, a resource of the NUL is a CG resource, and a resource of the SUL is a DG resource; or, resources of the NUL and the SUL are both CG resources.

In the manner 6, other information may be further considered during switching, such as a switching delay, a preference parameter of resource, a service priority, a state of carrier or resource, etc.

Manner 7:

The first information includes the service priority, and step 101 may be specifically implemented in the following manner:

if there exists in the NUL and the SUL at least one sixth uplink carrier or at least one second resource on which uplink data to be transmitted has a service priority higher than a service priority of uplink data transmitted on the second uplink carrier, selecting the first uplink carrier from the at least one sixth uplink carrier or an uplink carrier corresponding to the at least one second resource.

The service priority may be represented by a high/low QoS or a high/low priority of a service.

Specifically, if a service of uplink data to be transmitted on a UL carrier (or resource) is a high-priority service, the terminal device selects the uplink data of the service for transmission preferentially.

In an embodiment, the first uplink carrier may be determined in the following manners:

if the second uplink carrier belongs to the SUL, and a service priority corresponding to a carrier of the NUL is higher than a service priority corresponding to a carrier of the SUL, the at least one sixth uplink carrier is the carrier of the NUL; or if the second uplink carrier belongs to the SUL, and a service priority corresponding to a carrier of another SUL except the second uplink carrier in the SUL is higher than a service priority corresponding to the second uplink carrier, the at least one sixth uplink carrier is the carrier of the another SUL; or if the second uplink carrier belongs to the NUL, and a service priority corresponding to a carrier of the SUL is higher than a service priority corresponding to a carrier of the NUL, the at least one sixth uplink carrier is the carrier of the SUL; or, if the second uplink carrier belongs to the SUL, and a service priority corresponding to a resource in the NUL is higher than a service priority corresponding to a resource in the SUL, the at least one second resource is the resource in the NUL; or if the second uplink carrier belongs to the SUL, and a service priority corresponding to another resource except a resource of the second uplink carrier in the SUIL is higher than a service priority corresponding to the resource of the second uplink carrier, the at least one second resource is the another resource except the resource of the second uplink carrier in the SUL; or if the second uplink carrier belongs to the NUL, and a service priority corresponding to a resource in the SUL is higher than a service priority corresponding to a resource in the NUL, the at least one second resource is the resource in the SUL.

It is assumed that there are at least two SULs, and a service priority corresponding to a carrier of another SUL carrier except an SUL corresponding to the second uplink carrier in the at least two SULs is higher than a service priority corresponding to the second uplink carrier, then the at least one sixth uplink carrier is the carrier of the another SUL carrier.

Illustratively, if both the NUL and the SUL have a configured and activated CG resource, and a service priority corresponding to the CG resource of the NUL is higher, the terminal device preferentially selects the CG resource of the NUL to transmit uplink data in any case, such as where the CG resources of the NUL and the SUL conflict, or the second uplink carrier currently used by the terminal device is a carrier of the SUL, or a time difference between start times of the CG resources of the SUL and the NUL is less than a switching delay.

Furthermore, if a low-priority service is being transmitted, the terminal device may directly switch to a high-priority service for transmission without waiting for completion of transmission of the low-priority service.

The manner 7 is also applicable to switching between a CG resource and a DG resource, or switching between a DG resource and another DG resource, where a resource of the SUL is a CG resource, and a resources of the NUL is a DG resource; or, resources of the NUL and the SUL are both DG resources; or, a resource of the NUL is a CG resource, and a resource of the SUL is a DG resource; or, resources of the NUL and the SUL are both CG resources.

In the manner 7, other information may be further considered during switching, such as a switching delay, a preference parameter of resource, a preference parameter of carrier, a state of carrier or resource, etc.

In an embodiment, if both NUL and SUL are configured with a CG resource, if a CG resource of either the NUL or the SUL is transmitting uplink data of a certain service currently, and when a CG resource of another UL needs to be enabled for another service according to a mapping relationship between a logical channel priority of the another service and a CG resource, the terminal device compares priorities of the new service with the service on the current CG resource, and decides whether to stop the transmission of uplink data on the current CO resource and switch to a CG resource of a new UL carrier to transmit uplink data of the new service. For example, if the new service has a high priority or high-priority transmission, the terminal device switches to the new UL to transmit the high-priority service (even if the current CG resource has not yet finished transmitting data). For example, if the new service has a low priority or low-priority transmission, the terminal device will not switch to the new UL to transmit (preferentially guarantee the current service transmission).

As shown in FIG. 3, it is assumed that uplink data of service 1 is currently transmitted through a CG1 resource (for example, type1 CG resource) on a carrier of the NUL, and indication information of a network device is received (for example, through DCI indication), indicating transmitting uplink data of service 2, where a DG resource of a carrier of the SUL is used to transmit uplink data of a high-priority service, then the DG resource of the carrier of the SUL in the figure is switched to for transmitting the uplink data of service 2. In FIG. 3, since a time difference between the third CG1 resource and the DG resource of the carrier of the SUL is less than the switching delay, the third CG1 resource in FIG. 3 is unavailable, resulting in that the uplink data of service 1 cannot continue to be transmitted.

In FIG. 3, a time difference between the fourth CG1 resource and the DG resource of the carrier of the SUL is greater than the switching delay, and no indication of the network device is currently received, so it is possible to switch back to the CG1 resource of the carrier of the NUL to transmit the data of service 1.

Figure 4:
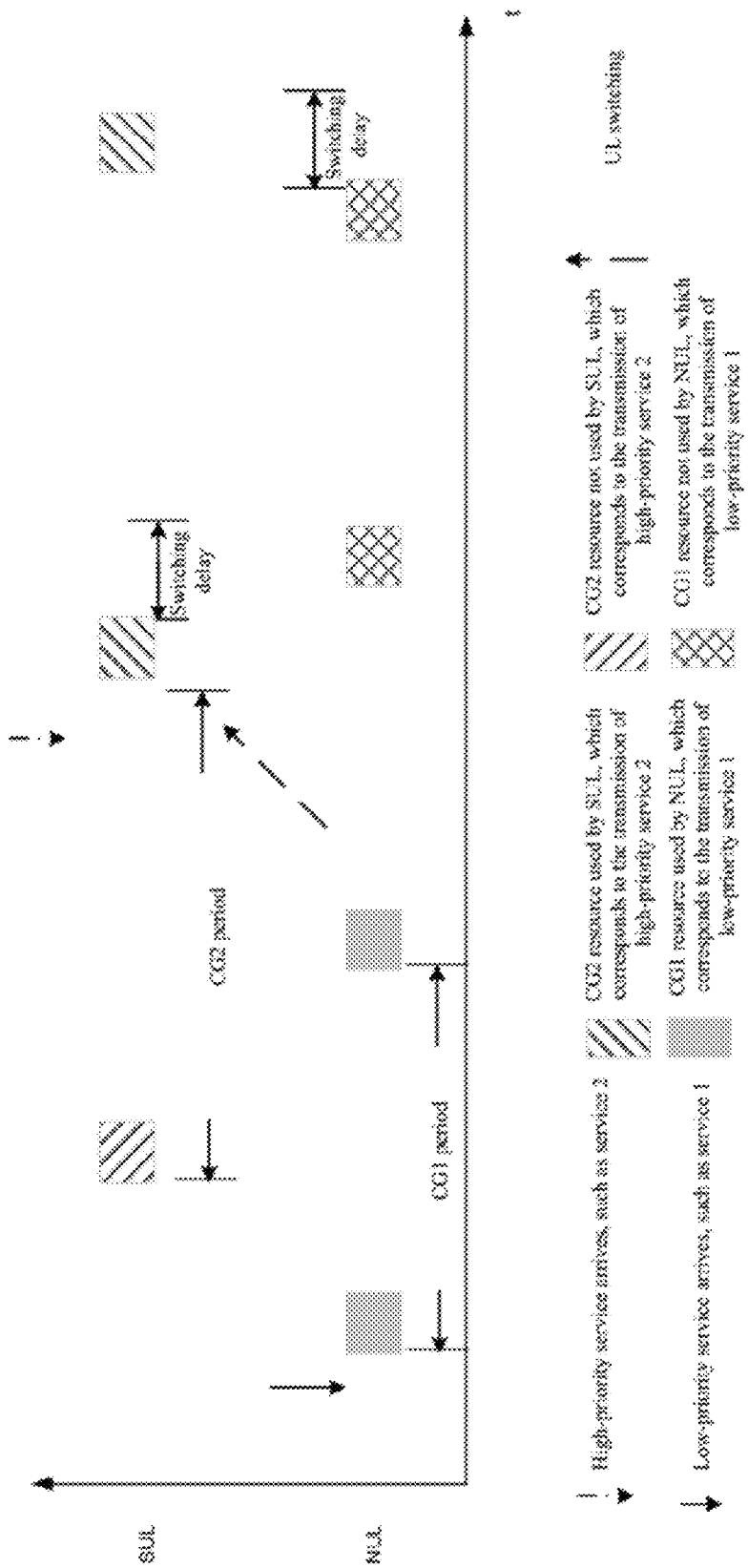
FIG. 4 is a schematic diagram of a switching principle according to another embodiment of the method provided by the present application.

As shown in FIG. 4, it is assumed that both carriers of NUL and SUL are configured with CG resources (the NUL is configured with CG1 resources, the SUL is configured with CG2 resources, type2 CG resources), and uplink data of service 1 is currently transmitted through a CG resource on the carrier of the NUL, thus in FIG. 4, the first CG2 resource on the carrier of the SUL is unavailable. Then, indication information of a network device is received (for example, indicated by DC), indicating transmitting uplink data of service 2, and the CG2 resource of the carrier of the SUL is used to transmit uplink data of a high-priority service, then the CG2 resource of the carrier of the SUL in FIG. 4 is switched to transmit the uplink data of service 2. Since a time difference between the third CG1 resource on the NUL and the CG2 resource of the carrier of the SUL in FIG. 4 is less than the switching delay, the third CG1 resource in FIG. 4 is unavailable, resulting in that the uplink data of service 1 cannot continue to be transmitted.

In FIG. 4, a time difference between the fourth CG1 resource on the NUL and the CG2 resource of the carrier of the SUL (the third CG2 resource on the SUL) is less than the switching delay, so the fourth CG1 resource on the NUL is unavailable. The terminal device continues to transmit the uplink data of service 2 on the third CG2 resource on the SUL.

Manner 8:

The first information includes the carrier identifier information for switching, and step 101 may be specifically implemented in the following manner:

selecting a carrier of the NUL from the NUL and the SUL as the first uplink carrier if the carrier identifier information indicates the carrier of the NUL; or, selecting a carrier with a smallest carrier identifier in the NUL and SUL as the first uplink carrier if the carrier identifier information indicates the carrier with the smallest carrier identifier; or selecting a carrier with a specific carrier identifier in the NUL and the SUL as the first uplink carrier if the carrier identifier information indicates the carrier with the specific carrier identifier.

If the carrier of the NUL is selected as the first uplink carrier, other information may be further considered, such as a switching delay, a preference parameter of resource, a preference parameter of carrier, a state of carrier or resource, etc.

In an embodiment, the method may further include:

receiving fifth indication information, where the fifth indication information includes the carrier identifier information. The fifth indication information is used to indicate that the first uplink carrier to be selected is a carrier of the NUL, or, used to indicate that the first uplink carrier is a carrier with the smallest carrier identifier, or used to indicate that the first uplink carrier is a carrier with a specific carrier identifier.

With the method of the embodiment of the present application, the terminal device can switch UL carriers flexibly, and determine a carrier or a resource for uplink transmission flexibly, and thus the terminal device is provided with the flexibility of uplink transmission, the transmission efficiency of resources is improved, and the problem of limited PUSCH resource capacity is alleviated to some extent.

In another embodiment of the present application, the terminal device switches from the first uplink carrier to the second uplink carrier if the terminal device completes transmission of uplink data by using a DG resource of the first uplink carrier; or, the terminal device switches from the first uplink carrier to the second uplink carrier if the terminal device completes transmission of uplink data by using an effective resource of the first uplink carrier, where the effective resource includes an effective DG resource and/or CG resource; or, the terminal device switches from the first uplink carrier to the second uplink carrier if the terminal device receives third indication information, where the third indication information includes information about the second uplink carrier.

Specifically, the terminal device determines whether to switch a carrier of an UL or remain on an uplink carrier of the current UL for data transmission, according to configured CG resources and/or scheduled DG resources, or an indication of the network side. If carrier switching is performed and the original second uplink carrier has a configured and activated CG resource, the terminal device may perform one of the following operations:

The terminal device actively switches back to the second uplink carrier after the transmission of a DG resource (one DG resource or repetitive DG resources) of the first uplink carrier is completed.

The terminal device actively switches back to the second uplink carrier after the transmission of an effective UL resource (a DG resource and/or a CG resource) of the First uplink carrier is completed. In addition, the effective UL resource may also be determined by means of network configuration or indication, for example, the network indicates a resource identifier/resource identifier list of the effective UL resource.

The terminal device reselects and switches back to the second uplink carrier only after the network side indicates transmitting on the second uplink carrier (e.g., indicating an identifier of the second uplink carrier or an identifier of a resource on the second uplink carrier through DCI). The network side may indicate information of the resource.

The method of the present embodiment is applicable to switching between any two carriers.

In the present embodiment, a simpler switching rule is given, that is, the terminal device may switch an UL carrier only when the terminal device receives an indication to switch the UL carrier from the network side, or when there are no effective resources (DG and/or CG) on a current uplink carrier. The advantage is that the complexity of terminal device processing is reduced.

Figure 5:
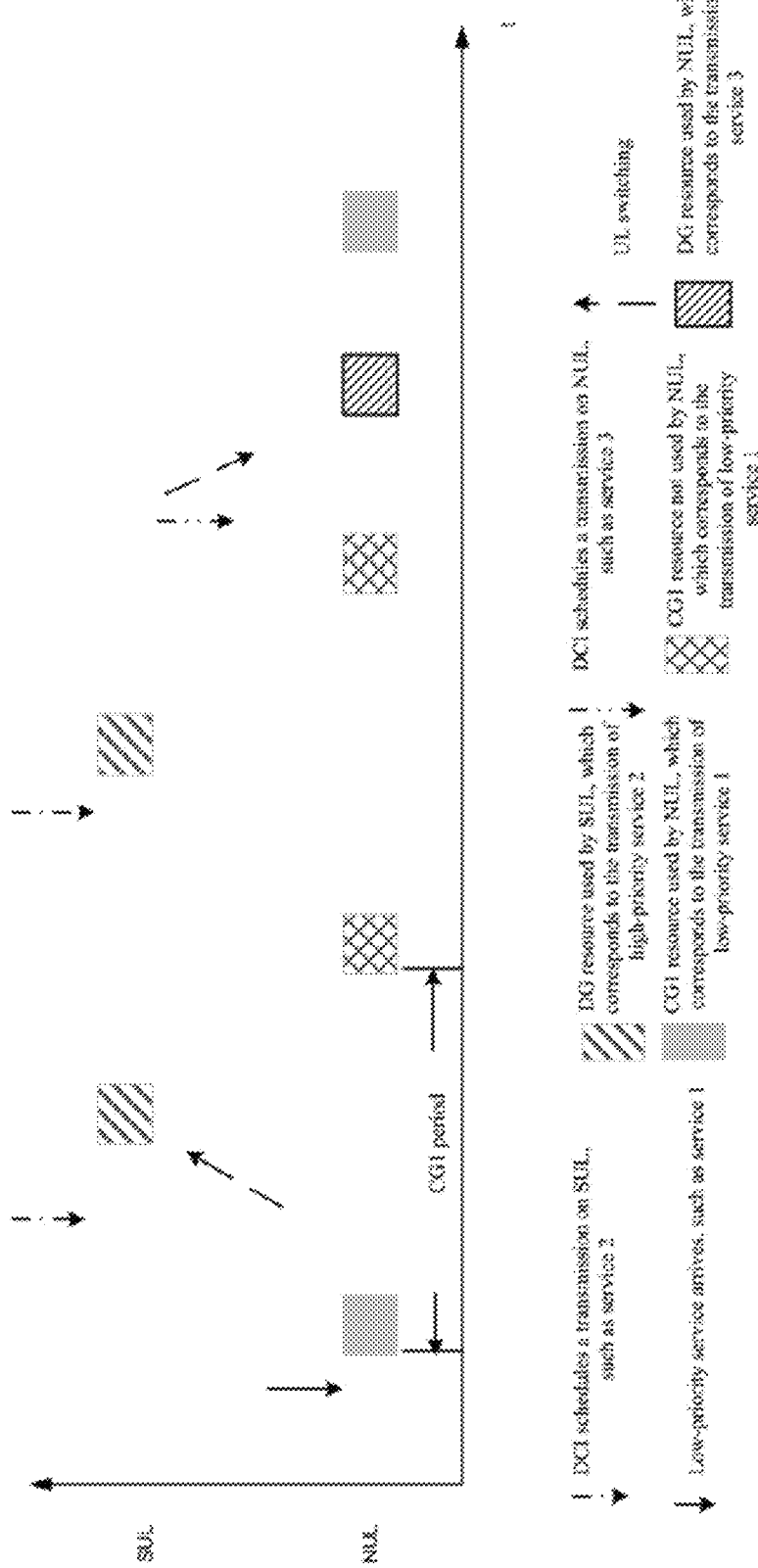
FIG. 5 is a schematic diagram of a switching principle according to yet another embodiment of the method provided by the present application.

As shown in FIG. 5, it is assumed that uplink data of service 1 is currently transmitted through a CG resource on a carrier of the NUL, and then, indication information of the network device is received, indicating transmitting uplink data of service 2, where a priority of service 2 is higher than that of service 1, and a DG resource of a carrier of the SUL is used to transmit uplink data of a high-priority service, then the DG resource of the carrier of the SUL in FIG. 5 is switched to for transmitting the uplink data of service 2.

Since the DG resource of the carrier of SUL in FIG. 5 has not completed the transmission of the uplink data of service 2, the second and third CG resources on the NUL in the figure are unavailable, resulting in that the uplink data of service 1 cannot continue to be transmitted.

In FIG. 5, after receiving a scheduling indication of the network device, which indicates that uplink data of service 3 is to be transmitted the on the NUL, a DG resource on the NUL is switched to, and after the transmission is completed (that is, after completion of using the effective resource), the fourth CG resource on the NUL is switched back to for transmitting the uplink data of service 1.

In another embodiment of the present application, a CG resource of the second uplink carrier is configured such that: the CG resource of the second uplink carrier is not used or is suspended if the terminal device switches from the second uplink carrier to the first uplink carrier; and the CG resource of the second uplink carrier is available or restored if the terminal device switches from the first uplink carrier to the second uplink carrier; or, the CG resource of the second uplink carrier is deactivated or deconfigured if the terminal device switches from the second uplink carrier to the first uplink carrier; and the CG resource of the second uplink carrier is activated or reconfigured if the terminal device switches from the first uplink carrier to the second uplink carrier.

Specifically, when determining to switch a UL carrier, or after determining a UL carrier, the terminal device may configure the original uplink carrier as:

A CG resource on the original second uplink carrier is temporarily not used or is suspended until the uplink carrier transmitting uplink data is switched to the original second uplink carrier again, and then an effective CG resource is used or an effective resource is restored (where the effective CG resource refer to a configured and activated CG resource after switching back to the original second uplink carrier).

The CG resource on the original second uplink carrier is deactivated or deconfigured. After the terminal device switches back to the original second uplink carrier, the network device reconfigures or activates the CG resource.

In this embodiment, the rules for using a resource of the original uplink carrier after switching are given. The unusable UL resources due to UL carrier switching of the terminal device, may be scheduled by the network to be used by other terminal device, thereby ensuring the effective use of system resources and avoiding the waste of system resources.

Figure 6:
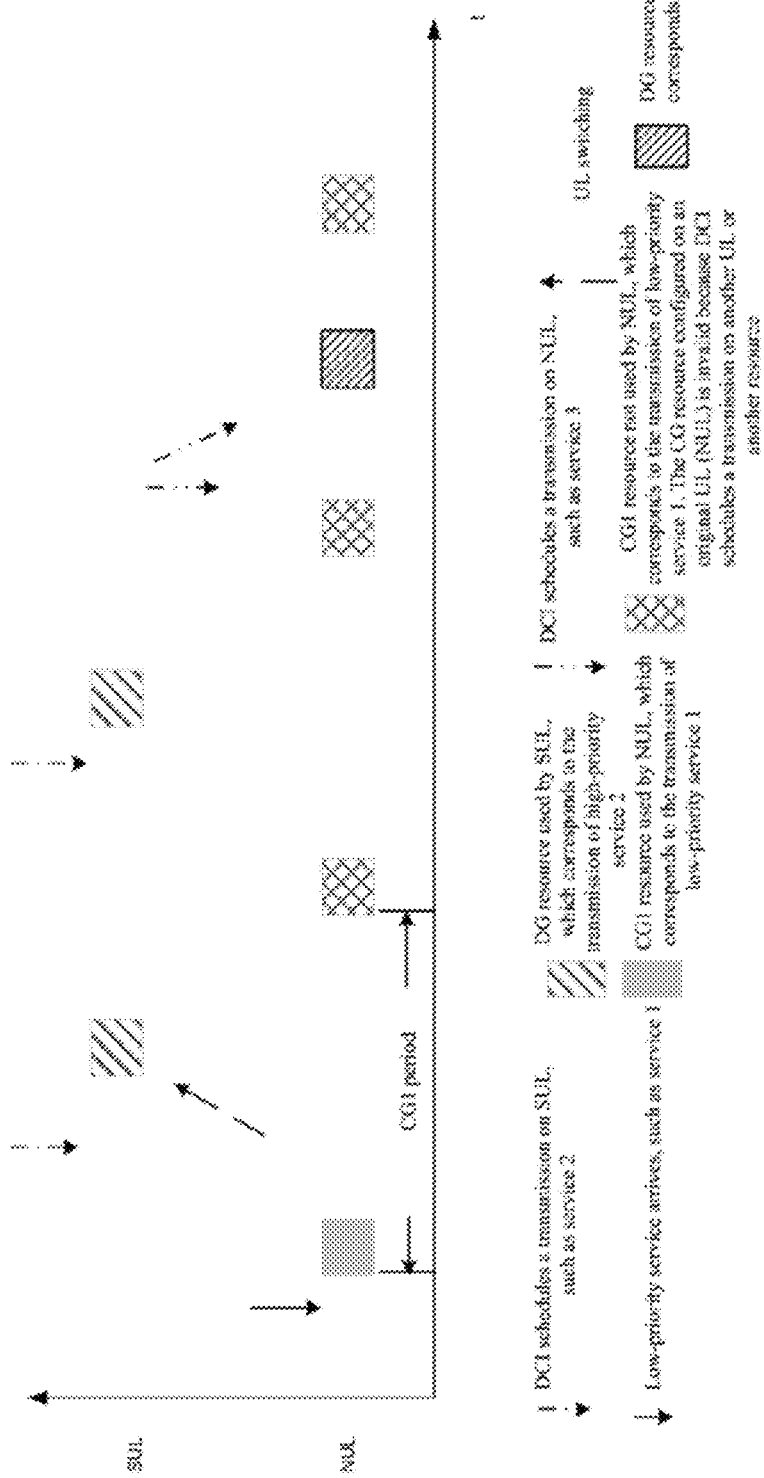
FIG. 6 is a schematic diagram of a switching principle according to yet another embodiment of the method provided by the present application.

As shown in FIG. 6, it is assumed that uplink data of service 1 is currently transmitted through a CG resource on a carrier of the NUL, and then, indication information of the network device is received, indicating transmitting uplink data of service 2, where a priority of service 2 is higher than that of service 1, and a DG resource of a carrier of the SUL is used to transmit uplink data of a high-priority service, then the DG resource of the carrier of the SUL in FIG. 6 is switched to for transmitting the uplink data of service 2. The second, third, and fourth CG resources on the NUL are configured as temporarily not used, deactivated, suspended or deconfigured, and the uplink data of service 1 cannot continue to be transmitted.

In FIG. 6, after a scheduling indication of the network device is received, which indicates that uplink data of service 3 is to be transmitted on the NUL, a DG resource on the NUL is switched to for transmitting the uplink data of service 3.

Figure 7:
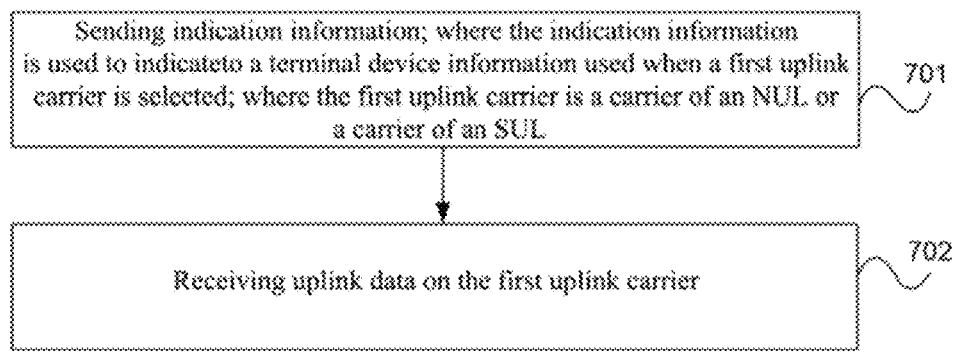
FIG. 7 is a flowchart of another embodiment of a data transmission method provided by the present application.

FIG. 7 is a flowchart of another embodiment of a data transmission method provided by the present application. As shown in FIG. 7, the specific implementation steps of this embodiment include:

Step 701: sending indication information: where the indication information is used to indicate to a terminal device information used when a first uplink carrier is selected; where the first uplink carrier is a carrier of an NUL or a carrier of an SUL.

In an embodiment, the indication information includes at least one of the following:
  information about whether the terminal device is allowed to switch a carrier;
  information about a carrier or a resource of the NUL and/or the SUL;
  a switching delay required for the terminal device to switch from a second uplink carrier currently used to another carrier of the SUL or the NUL;
  a preset duration, where a time interval between two adjacent times of carrier switching of the terminal device is not allowed to be less than or equal to the preset duration;
  a preference parameter of resource;
  a state of carrier or resource, where the state is an active state or an inactive state;
  a preference parameter of carrier;
  a service priority corresponding to uplink data transmitted on a carrier or a resource;
  carrier identifier information for switching;
  information indicating to switch to a first to-be-switched carrier or a resource corresponding to the first to-be-switched carrier; or
  information about whether a resource of an original carrier is available after carrier switching.

The method of this embodiment of the present application may be in a scenario where the terminal device is configured with an NUL and at least one SUL, the terminal device may perform uplink transmission with a network device through carriers of the NUL and the at least one SUL.

In an embodiment, carrier information of the NUL, carrier information of the one or more SULs and resource information may be indicated through a system message broadcast (for example, SIB1) of a serving cell; that is, the network device may configure information of carriers or resources to the terminal device.

In an embodiment, the serving cell may further broadcast preference parameter information of the NUL and the at least one SUL carrier, or broadcast preference parameter information of transmission resources on carriers of the NUL and the at least one SUL carrier, where the preference parameter information includes, for example, information about a priority and/or a selection factor, that is, the network device may configure the preference parameters of carriers or resources to the terminal device.

The network device may further configure to the terminal device whether the terminal device can select or switch a carrier, and a switching delay required for the terminal device to switch from a second uplink carrier currently used to another carrier of the NUL or the SUL; the preset duration, where a time interval between two adjacent times of carrier switching of the terminal device is not allowed to be less than or equal to the preset duration; the state of carrier or resource of the NUL and/or the SUL, where the state is the active state or the inactive state; the service priority corresponding to the uplink data transmitted on the carrier or resource of the NUL and/or the SUL; the carrier identifier information for switching, etc.

Step 702: receiving uplink data on the first uplink carrier.

The above indication information may be pre-configured before the terminal device performs uplink transmission, and does not need to be configured before uplink data is transmitted each time.

In an embodiment, if the indication information includes the information indicating to switch to a first to-be-switched carrier or a resource corresponding to a first to-be-switched carrier, the first uplink carrier is the first to-be-switched carrier.

In an embodiment, if the indication information includes the switching delay; the method further includes:

sending first indication information, where the first indication information includes a start time of a resource of a second to-be-switched carrier; and the first indication information may further include at least one of the following: a second switching identifier, and an identifier of the second to-be-switched carrier;

the first uplink carrier is the second to-be-switched carrier if a time difference between the start time of the resource of the second to-be-switched carrier and a start time of a resource of the second uplink carrier is greater than the switching delay;

or, the first uplink carrier is the second to-be-switched carrier if a time difference between a reception time or a solution time of the first indication information and the start time of the resource of the second to-be-switched carrier is greater than the switching delay.

In an embodiment, if the indication information includes the switching delay; the first uplink carrier is a carrier of the SUL if a time difference between a start time of a configured grant CG resource of the NUL and a start time of a CG resource of the SUL is greater than or equal to the switching delay, and the second uplink carrier is a carrier of the NUL;

the first uplink carrier is a carrier of the NUL if a time difference between a start time of a CG resource of the NUL and a start time of a CG resource of the SUL is greater than or equal to the switching delay, and the second uplink carrier is a carrier of the SUL.

In an embodiment, if the indication information includes the preference parameter of resource and the preference parameter includes a priority and/or a selection factor, the first uplink carrier is a carrier of at least one third uplink carrier in the NUL and the SUL, where a preference parameter of resource of the at least one third uplink carrier is higher than a preference parameter of resource of the second uplink carrier.

In an embodiment, if the indication information includes the state of carrier, the first uplink carrier is a carrier of at least one fourth uplink carrier in the NUL and the SUL, where a state of carrier of the least one fourth uplink carrier is the active state; or if the indication information includes the state of resource, the first uplink carrier is a carrier of an uplink carrier corresponding to at least one first resource in the NUL and the SUL, where a state of resource of the at least one first resource is the active state.

In an embodiment, if the indication information includes the preference parameter of carrier, the preference parameter of carrier including a priority and/or a selection factor, the first uplink carrier is a carrier of at least one fifth uplink carrier in the NUL and the SUL, where a preference parameter of the at least one fifth uplink carrier is higher than a preference parameter of the second uplink carrier.

In an embodiment, if the indication information includes the service priority, the first uplink carrier is a carrier of at least one sixth uplink carrier or a carrier in an uplink carrier corresponding to at least one second resource in the NUL and the SUL, where a service priority of uplink data to be transmitted on the at least one sixth uplink carrier or on the at least one second resource is higher than a service priority of uplink data transmitted on the second uplink carrier.

In an embodiment, if the indication information includes the carrier identifier information, the first uplink carrier is a carrier of the NUL if the carrier identifier information indicates the carrier of the NUL; or, the first uplink carrier is a carrier with a smallest carrier identifier in the NUL and SUL if the carrier identifier information indicates the carrier with the smallest carrier identifier; or, the first uplink carrier is a carrier with a specific carrier identifier in the NUL and the SUL if the carrier identifier information indicates the carrier with the specific carrier identifier.

In an embodiment, the indication information includes the information about whether a resource of an original carrier is available after carrier switching, where a CG resource of the second uplink carrier is configured such that: the CG resource of the second uplink carrier is not used or is suspended if the terminal device switches from the second uplink carrier to the first uplink carrier; and the CG resource of the second uplink carrier is available or restored if the terminal device switches from the first uplink carrier to the second uplink carrier; or, the CG resource of the second uplink carrier is deactivated or deconfigured if the terminal device switches from the second uplink carrier to the first uplink carrier; and the CG resource of the second uplink carrier is activated or reconfigured if the terminal device switches from the first uplink carrier to the second uplink carrier.

The implementation principle and technical effect of the method in this embodiment are similar to those of the foregoing method on the terminal device side, which will not be repeated here.

Figure 8:
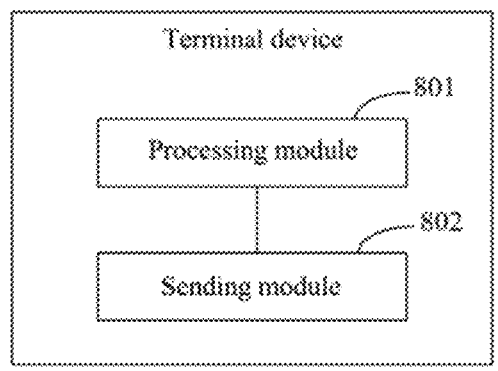
FIG. 8 is a schematic structural diagram of a first embodiment of a terminal device provided by the present application.

FIG. 8 is a schematic structural diagram of a first embodiment of a terminal device provided by the present application. As shown in FIG. 8, the terminal device includes:

a processing module 801, configured to determine a first uplink carrier used by uplink data to be transmitted according to first information; where the first uplink carrier is a carrier of a normal uplink NUL or a carrier of a supplementary uplink SUL; where the first information is configured to indicate at least one of time limit information, carrier information, resource information or service information used when selecting an uplink carrier; and a sending module 802, configured to send the uplink data by using the first uplink carrier.

In a possible implementation manner, the time limit information includes at least one of the following:

a switching delay required for the terminal device to switch from a second uplink carrier currently used to another uplink carrier of the SUL or the NUL; and a preset duration, where a time interval between two adjacent times of carrier switching is not allowed to be less than or equal to the preset duration.

In a possible implementation manner, the carrier information includes at least one of the following:

a state of carrier, where the state is an active state or an inactive state;

a preference parameter of carrier;

carrier identifier information for switching; and
information about a first to-be-switched carrier indicated by a network side.

In a possible implementation manner, the resource information includes at least one of the following:
a state of resource, where the state is an active state or an inactive state;
a preference parameter of resource; and
resource information corresponding to a first to-be-switched carrier indicated by a network side.

In a possible implementation manner, the service information includes a service priority corresponding to uplink data transmitted on a carrier or a resource.

In a possible implementation manner, the processing module 801 is further configured to:
switch from the second uplink carrier to the first uplink carrier if the first uplink carrier is different from the second uplink carrier; or,
continuing to transmit uplink data on the second uplink carrier if the first uplink carrier is the same as the second uplink carrier.

In a possible implementation manner, the first information includes information about a first to-be-switched carrier indicated by the network side or resource information corresponding to the first to-be-switched carrier indicated by the network side, the processing module 801 is specifically configured to:
take the first to-be-switched carrier as the first uplink carrier.

In a possible implementation manner, if the first information includes: the switching delay: the terminal device further includes:
a receiving module, configured to receive first indication information, where the first indication information includes a start time of a resource of a second to-be-switched carrier; and
the processing module 801 is specifically configured to:
determine whether to take the second to-be-switched carrier as the first uplink carrier according to the start time of the resource of the second to-be-switched carrier included in the first indication information and the switching delay included in the first information.

In a possible implementation manner, the processing module 801 is specifically configured to:
take the second to-be-switched carrier as the first uplink carrier if a time difference between the start time of the resource of the second to-be-switched carrier and a start time of a resource of the second uplink carrier is greater than the switching delay;
or,
take the second to-be-switched carrier as the first uplink carrier if a time difference between a reception time or a solution time of the first indication information and the start time of the resource of the second to-be-switched carrier is greater than the switching delay.

In a possible implementation manner, the processing module 801 is further configured to:
switch from the second uplink carrier to the first uplink carrier no later than a time moment N-K;
or, the sending module 802 is specifically configured to:
send the uplink data by using the first uplink carrier no later than the time moment N-K; where N is a start time of a resource of the first uplink carrier, and K is the switching delay.

In a possible implementation manner, if the first information includes: the switching delay, the processing module 801 is specifically configured to:

take a carrier of the SUL as the first uplink carrier if a time difference between a start time of a configured grant CG resource of the NUL and a start time of a CO resource of the SUL is greater than or equal to the switching delay, and the second uplink carrier is a carrier of the NUL;
take a carrier of the NUL as the first uplink carrier if a time difference between a start time of a CG resource of the NUL and a start time of a CG resource of the SUL is greater than or equal to the switching delay, and the second uplink carrier is a carrier of the SUL.

In a possible implementation manner, the switching delay includes a switching delay for a radio frequency RF link.

In a possible implementation manner, switching delays for the terminal device to switch from an uplink carrier of the NUL to an uplink carrier of the SUL, switch from an uplink carrier of the SUL to an uplink carrier of another SUL or switch from an uplink carrier of the SUL to an uplink carrier of the NUL are the same or different.

In a possible implementation manner, if the first information includes the preset duration, the processing module 801 is specifically configured to:
take the second uplink carrier currently used as the first uplink carrier if a time interval between a current time and a time of latest carrier switching is determined to be less than the preset duration.

In a possible implementation manner, if the first information includes the preference parameter of resource, the preference parameter including a priority and/or a selection factor, the processing module 801 is specifically configured to:
if there exists in the NUL and the SUL at least one third uplink carrier of which a preference parameter of resource is higher than a preference parameter of resource of the second uplink carrier currently used, select the first uplink carrier from the at least one third uplink carrier.

In a possible implementation manner, if the second uplink carrier belongs to the SUL, and a preference parameter of resource of the NUL is higher than a preference parameter of resource of the SUL, the at least one third uplink carrier is a carrier of the NUL; or
if the second uplink carrier belongs to the SUL, and a preference parameter of resource of another SUL except the second uplink carrier in the SUL is higher than a preference parameter of resource of the second uplink carrier, the at least one third uplink carrier is a carrier of the another SUL; or
if the second uplink carrier belongs to the NUL, and a preference parameter of resource of the SUL is higher than a preference parameter of resource of the NUL, the at least one third uplink carrier is a carrier of the SUL; or
the processing module 801 is specifically configured to:
if the at least one third uplink carrier includes a carrier of the NULl, select the carrier of the NUL from the at least one third uplink carrier as the first uplink carrier; or
take a carrier with a smallest carrier identifier in the at least one third uplink carrier as the first uplink carrier; or
take a carrier with a specific carrier identifier in the at least one third uplink carrier as the first uplink carrier.

In a possible implementation manner, a resource of the at least one third uplink carrier is a dynamic grant DG resource, and a resource of the second uplink carrier is a CG resource.

In a possible implementation manner, if the first information includes the state of carrier; the processing module 801 is specifically configured to:

if there exists in the NUL and the SUL at least one fourth uplink carrier of which a state is the active state, select the first uplink carrier from the at least one fourth uplink carrier.

In a possible implementation manner, if the first information includes the state of resource: the processing module 801 is specifically configured to:

if there exists in the NUL and the SUL at least one first resource of which a state is the active state, select the first uplink carrier from an uplink carrier corresponding to the at least one first resource.

In a possible implementation manner, a resource of the at least one fourth uplink carrier is a CG resource; or the at least one first resource is a CG resource.

In a possible implementation manner, the first information includes the preference parameter of the carrier, the preference parameter including a priority and/or a selection factor, the processing module 801 is specifically configured to:

if there exists in the NUL and the SUL at least one fifth uplink carrier of which a preference parameter is higher than a preference parameter of the second uplink carrier currently used, select the first uplink carrier from the at least one fifth uplink carrier.

In a possible implementation manner, if the second uplink carrier belongs to the SUL, and a preference parameter of carrier of the NUL is higher than a preference parameter of carrier of the SUL, the at least one fifth uplink carrier is a carrier of the NUL; or if the second uplink carrier belongs to the NUL, and a preference parameter of carrier of the SUL is higher than a preference parameter of carrier of the NUL, the at least one fifth uplink carrier is a carrier of the SUL; or if the second uplink carrier belongs to the SUL, and a preference parameter of carrier of another SUL except the second uplink carrier in the SUL is higher than a preference parameter of the second uplink carrier, the at least one fifth uplink carrier is a carrier of the another SUL.

In a possible implementation manner, the first information includes the service priority, and the processing module 801 is specifically configured to:

if there exists in the NUL and the SUL at least one sixth uplink carrier or at least one second resource on which uplink data to be transmitted has a service priority higher than a service priority of uplink data transmitted on the second uplink carrier, select the first uplink carrier from the at least one sixth uplink carrier or an uplink carrier corresponding to the at least one second resource.

In a possible implementation manner, if the second uplink carrier belongs to the SUL, and a service priority corresponding to a carrier of the NUL is higher than a service priority corresponding to a carrier of the SUL, the at least one sixth uplink carrier is the carrier of the NUL; or if the second uplink carrier belongs to the SUL, and a service priority corresponding to a carrier of another SUL except the second uplink carrier in the SUL is higher than a service priority corresponding to the second uplink carrier, the at least one sixth uplink carrier is the carrier of the another SUL; or if the second uplink carrier belongs to the NUL, and a service priority corresponding to a carrier of the SUL is higher than a service priority corresponding to a carrier of the NUL, the at least one sixth uplink carrier is the carrier of the SUL; or, if the second uplink carrier belongs to the SUL, and a service priority corresponding to a resource in the NUL is higher than a service priority corresponding to a resource in the SUL, the at least one second resource is the resource in the NUL; or if the second uplink carrier belongs to the SUL, and a service priority corresponding to another resource except a resource of the second uplink carrier in the SUL is higher than a service priority corresponding to the resource of the second uplink carrier, the at least one second resource is the another resource; or if the second uplink carrier belongs to the NUL, and a service priority corresponding to a resource in the SUL is higher than a service priority corresponding to a resource in the NUL, the at least one second resource is the resource in the SUL.

In a possible implementation manner, the first information includes the carrier identifier information, and the processing module 801 is specifically configured to:

select a carrier of the NUL from the NUL and the SUL as the first uplink carrier if the carrier identifier information indicates the carrier of the NUL; or select a carrier with a smallest carrier identifier in the NUL and SUL as the first uplink carrier if the carrier identifier information indicates the carrier with the smallest carrier identifier; or select a carrier with a specific carrier identifier in the NUL and the SUL as the first uplink carrier if the carrier identifier information indicates the carrier with the specific carrier identifier.

In a possible implementation manner, the processing module 801 is further configured to:

determine the second uplink carrier currently used according to second information; where the second information includes at least one of the following: preference parameters of resource in the NUL and the SUL, preference parameters of carrier of the NUL and the SUL, a reference signal received power RSRP, a reference signal received quality RSRQ, or second indication information sent by a network device; where the second indication information is used to indicate initial carrier information, or to indicate information about the first uplink carrier.

In a possible implementation manner, the processing module 801 is further configured to:

switch from the first uplink carrier to the second uplink carrier if the terminal device completes transmission of uplink data by using a DG resource of the first uplink carrier; or switch from the first uplink carrier to the second uplink carrier if the terminal device completes transmission of uplink data by using an effective resource of the first uplink carrier, where the effective resource includes an effective DG resource and/or CG resource; or, switch from the first uplink carrier to the second uplink carrier if the terminal device receives third indication information, where the third indication information includes information about the second uplink carrier.

In a possible implementation manner, a CG resource of the second uplink carrier is configured such that: the CG resource of the second uplink carrier is not used or is suspended if the terminal device switches from the second uplink carrier to the first uplink carrier; and the CG resource of the second uplink carrier is available or restored if the terminal device switches from the first uplink carrier to the second uplink carrier; or, the CG resource of the second uplink carrier is deactivated or deconfigured if the terminal device switches from the second uplink carrier to the first uplink carrier; and the CG resource of the second uplink carrier is activated or reconfigured if the terminal device switches from the first uplink carrier to the second uplink carrier.

In a possible implementation manner, the NUL and the SUL each correspond to a preference parameter; where the preference parameter include a priority and/or a selection factor.

In a possible implementation manner, respective preference parameters corresponding to the NUL and at least one SUL are the same, or, the preference parameter corresponds to the NUL is a first parameter a, while the preference parameter corresponds to each of the at least one SUL is (1−a)/n, where n is the number of the at least one SUL.

In a possible implementation manner, both the NUL and the SUL are configured with a CG resource, and types of CG resources configured for the NUL and the SUL are the same or different; or, one of the NUL and the SUL is configured with a CG resource.

In a possible implementation manner, the receiving module is further configured to:

receive fourth indication information, where the fourth indication information is used to configure whether the terminal device is allowed to switch a carrier.

In a possible implementation manner, the receiving module is further configured to:

receive fifth indication information, where the fifth indication information includes the carrier identifier information.

The terminal device in this embodiment is used to implement the technical solution on the terminal device side. For the implementation principle and technical effect, reference is made to the foregoing method embodiments on the terminal device side, which will not be repeated here.

Figure 9:
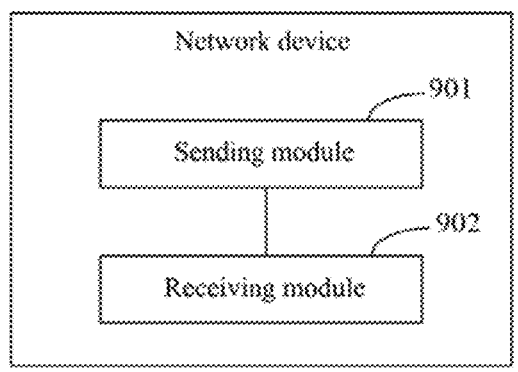
FIG. 9 is a schematic structural diagram of a first embodiment of a network device provided by the present application.

FIG. 9 is a schematic structural diagram of a first embodiment of a network device provided by the present application. As shown in FIG. 9, the network device includes:

a sending module 901, configured to send indication information; where the indication information is used to indicate to a terminal device information used when a first uplink carrier is selected; where the first uplink carrier is a carrier of an NUL or a carrier of an SUL; and a receiving module 902, configured to receive uplink data on the first uplink carrier.

In a possible implementation manner, the indication information includes at least one of the following:

information about whether the terminal device is allowed to switch a carrier;

information about a carrier or a resource of the NUL and/or the SUL;

a switching delay required for the terminal device to switch from a second uplink carrier currently used to another carrier of the SUL or the NUL;

a preset duration, where a time interval between two adjacent times of carrier switching of the terminal device is not allowed to be less than or equal to the preset duration;

a preference parameter of resource;

a state of carrier or resource, where the state is an active state or an inactive state;

a preference parameter of carrier;

a service priority corresponding to uplink data transmitted on a carrier or a resource;

carrier identifier information for switching;

information indicating to switch to a first to-be-switched carrier or a resource corresponding to the first to-be-switched carrier; and information about whether a resource of an original carrier is available after carrier switching.

In a possible implementation manner, if the indication information includes the information indicating to switch to the first to-be-switched carrier or the resource corresponding to the first to-be-switched carrier, the first uplink carrier is the first to-be-switched carrier.

In a possible implementation manner, if the indication information includes the switching delay; the sending module 901 is further configured to:

send first indication information, where the first indication information includes a start time of a resource of a second to-be-switched carrier;

the first uplink carrier is the second to-be-switched carrier if a time difference between the start time of the resource of the second to-be-switched carrier and a start time of a resource of the second uplink carrier is greater than the switching delay;

or, the first uplink carrier is the second to-be-switched carrier if a time difference between a reception time or a solution time of the first indication information and the start time of the resource of the second to-be-switched carrier is greater than the switching delay.

In a possible implementation manner, if the indication information includes the switching delay; the first uplink carrier is a carrier of the SUL if a time difference between a start time of a configured grant CG resource of the NUL and a start time of a CG resource of the SUL is greater than or equal to the switching delay, and the second uplink carrier is a carrier of the NUL;

the first uplink carrier is a carrier of the NUL if a time difference between a start time of a CG resource of the NUL and a start time of a CG resource of the SUL is greater than or equal to the switching delay, and the second uplink carrier is a carrier of the SUL.

In a possible implementation manner, if the indication information includes the preference parameter of resource and the preference parameter includes the priority and/or the selection factor, the first uplink carrier is a carrier of at least one third uplink carrier in the NUL and the SUL, where a preference parameter of resource of the at least one third uplink carrier is higher than a preference parameter of resource of the second uplink carrier.

In a possible implementation:

if the indication information includes the state of carrier, the first uplink carrier is a carrier of at least one fourth uplink carrier in the NUL and the SUL, where a state of the least one fourth uplink carrier is the active state; or if the indication information includes the state of resource, the first uplink carrier is a carrier of an uplink carrier corresponding to at least one first resource in the NUL and the SUL, where a state of resource of the at least one first resource is the active state.

In a possible implementation manner, if the indication information includes the preference parameter of carrier, the preference parameter of carrier including the priority and/or the selection factor, then the first uplink carrier is a carrier of at least one fifth uplink carrier in the NUL and the SUL where a preference parameter of the at least one fifth uplink carrier is higher than a preference parameter of the second uplink carrier.

In a possible implementation manner, if the indication information includes the service priority, the first uplink carrier is a carrier of at least one sixth uplink carrier or an uplink carrier corresponding to at least one second resource in the NUL and the SUL, where a service priority of uplink data to be transmitted on the at least one sixth uplink carrier or on the at least one second resource is higher than a service priority of uplink data transmitted on the second uplink carrier.

In a possible implementation manner, if the indication information includes: the carrier identifier information,
  the first uplink carrier is a carrier of the NUL if the carrier identifier information indicates the carrier of the NUL; or,
  the first uplink carrier is a carrier with a smallest carrier identifier in the NUL and SUL if the carrier identifier information indicates the carrier with the smallest carrier identifier; or,
  the first uplink carrier is a carrier with a specific carrier identifier in the NUL and the SUL if the carrier identifier information indicates the carrier with the specific carrier identifier.

In a possible implementation manner, the indication information includes the information about whether a resource of an original carrier is available after carrier switching, where a CG resource of the second uplink carrier is configured such that: the CG resource of the second uplink carrier is not used or is suspended if the terminal device switches from the second uplink carrier to the first uplink carrier; and the CG resource of the second uplink carrier is available or restored if the terminal device switches from the first uplink carrier to the second uplink carrier; or,
  the CG resource of the second uplink carrier is deactivated or deconfigured if the terminal device switches from the second uplink carrier to the first uplink carrier; and the CG resource of the second uplink carrier is activated or reconfigured if the terminal device switches from the first uplink carrier to the second uplink carrier.

The network device in this embodiment is used to implement the technical solution on the network device side. For the implementation principle and technical effect, refer to the foregoing method embodiments on the network device side, which will not be repeated here.

Figure 10:
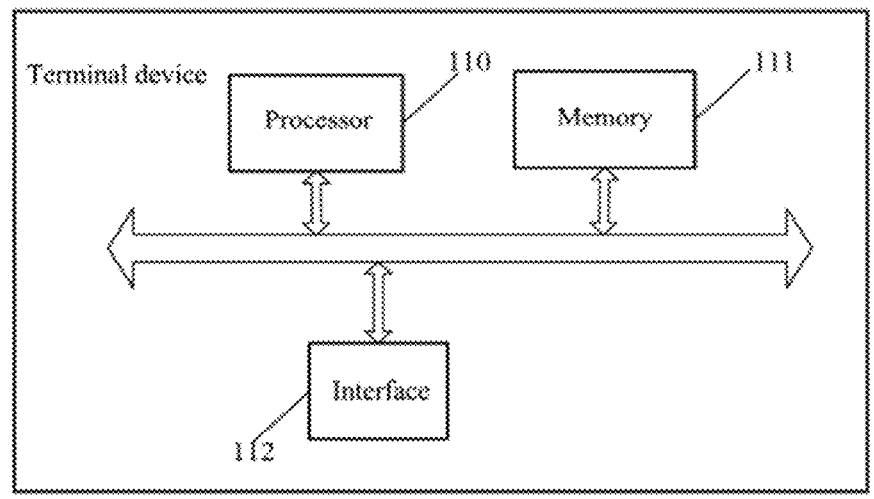
FIG. 10 is a schematic structural diagram of a second embodiment of a terminal device provided by the present application.

FIG. 10 is a schematic structural diagram of a second embodiment of a terminal device provided by the present application. As shown in FIG. 10, the terminal device includes:
  a processor 110, a memory 111, and an interface 112 for communicating with another device; the another device includes, for example, a network device or another terminal device; where
  the memory 111 stores computer-executable instructions;
  the processor 110 executes the computer-executable instructions stored in the memory to cause the processor 110 to execute the technical solution on the terminal device side in any of the foregoing method embodiments.

FIG. 10 is a simple design of a terminal device. The embodiments of the present application do not limit the number of processors and memories in the terminal device. FIG. 10 only takes the number of one as an example for illustration.

Figure 11:
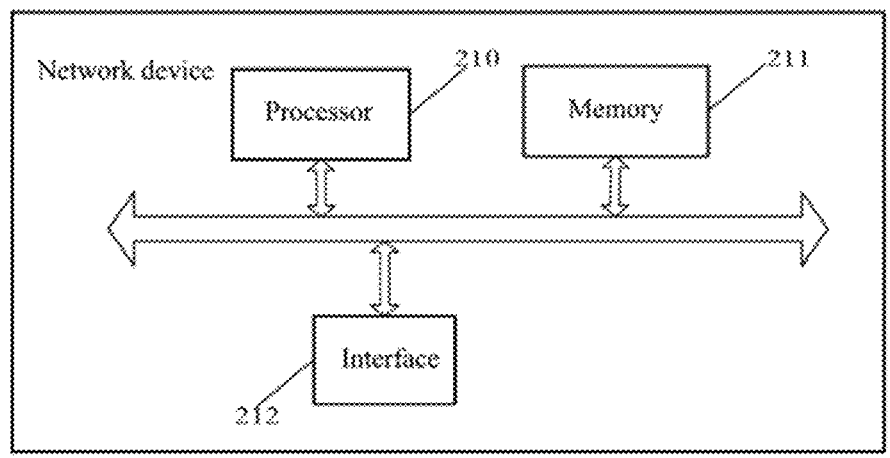
FIG. 11 is a schematic structural diagram of a second embodiment of a network device provided by the present application.

FIG. 11 is a schematic structural diagram of a second embodiment of a network device provided by the present application. As shown in FIG. 11, the network device includes:
  a processor 210, a memory 211, and an interface 212 for communicating with a terminal device; where
  the memory 211 stores computer-executable instructions;
  the processor 210 executes the computer-executable instructions stored in the memory 211 to cause the processor 210 to execute the technical solution on the network device side in any of the foregoing method embodiments.

FIG. 11 is a simple design of a network device. The embodiments of the present application do not limit the number of processors and memories in the network device. FIG. 11 only takes the number of one as an example for illustration.

In a specific implementation of the terminal device shown in FIG. 10 and the network device shown in FIG. 11, the memory, the processor and the interface may be connected through a bus, and in an implementation, the memory may be integrated inside the processor.

An embodiment of the present application further provides a computer-readable storage medium, where the computer-readable storage medium stores computer-executable instructions, and the computer-executable instructions are used to implement the technical solution of the terminal device in any of the foregoing method embodiments when being executed by a processor.

An embodiment of the present application further provides a computer-readable storage medium, where the computer-readable storage medium stores computer-executable instructions, and the computer-executable instructions are used to implement the technical solution of the network device in any of the foregoing method embodiments when being executed by a processor.

An embodiment of the present application further provides a program, where the program is configured to execute the technical solution of the terminal device in any of the foregoing method embodiments when being executed by a processor.

An embodiment of the present application further provides a program, where the program is configured to execute the technical solution of the network device in any of the foregoing method embodiments when being executed by a processor.

In an implementation, the above-mentioned processor may be a chip.

An embodiment of the present application further provides a computer program product, including program instructions, where the program instructions are configured to implement the technical solution of the terminal device in any of the foregoing method embodiments.

An embodiment of the present application further provides a computer program product, including program instructions, where the program instructions are configured to implement the technical solution of the network device in any of the foregoing method embodiments.

An embodiment of the present application further provides a chip, which includes a processing module and a communication interface, where the processing module can execute the technical solutions on the terminal device side in any of the foregoing method embodiments.

Furthermore, the chip further includes a storage module (such as a memory), the storage module is configured to store instructions, the processing module is configured to execute the instructions stored in the storage module, and the execution of the instructions stored in the storage module causes the processing module to execute the technical solutions on the terminal device side in any of the foregoing method embodiments.

An embodiment of the present application further provides a chip, which includes a processing module and a communication interface, where the processing module can execute the technical solutions on the network device side in any of the foregoing method embodiments.

Furthermore, the chip further includes a storage module (such as a memory), the storage module is configured to store instructions, the processing module is configured to execute the instructions stored in the storage module, and the execution of the instructions stored in the storage module causes the processing module to execute the technical solutions on the terminal device side in any of the foregoing method embodiments.

In the several embodiments provided in the present application, it should be understood that the disclosed devices and methods may be implemented in other ways. For example, the device embodiments described above are only illustrative. For example, the division of the modules is only a logical function division, and there may be other divisions in actual implementation, for example, multiple modules may be combined or integrated to another system, or some features may be ignored, or not implemented. In addition, the displayed or discussed mutual coupling or direct coupling or communication connection may be indirect coupling or communication connection through some interfaces or modules, and may be in electrical, mechanical or other forms.

In the specific implementation of the aforementioned terminal device and network device, it should be understood that the processor may be a central processing unit (CPU), or other general-purpose processor, digital signal processor (DSP), application specific integrated circuit (ASIC), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or a part of the steps in the aforementioned method embodiments may be implemented by a program instructing relevant hardware. The aforementioned program may be stored in a readable memory. When the program is executed, the steps including the aforementioned method embodiments are executed; and the foregoing memory (storage medium) includes: a read-only memory (ROM), a RAM, a flash memory, a hard disk, a solid-state drive, a magnetic tape, a floppy disk, an optical disc and any combination thereof.

What is claimed is:

1. A data transmission method, comprising:
    determining, by a terminal device, a first uplink carrier used by uplink data to be transmitted according to first information; wherein the first uplink carrier is a carrier of a normal uplink (NUL) or a carrier of a supplementary uplink (SUL); wherein the first information is used to indicate time limit information used when selecting an uplink carrier, and the time limit information comprises a switching delay required for the terminal device to switch from a second uplink carrier currently used to another uplink carrier of the SUL or the NUL; and
    sending, by the terminal device, the uplink data by using the first uplink carrier;
    wherein before the determining the first uplink carrier used by the uplink data to be transmitted the method further comprises:
        receiving, by the terminal device, first indication information, wherein the first indication information comprises a start time of a resource of a second to-be-switched carrier; and
    wherein the determining, by the terminal device, the first uplink carrier used by the uplink data to be transmitted according to the first information comprises;
        determining, by the terminal device, whether to take the second to-be-switched carrier as the first uplink carrier according to the start time of the resource of the second to-be-switched carrier comprised in the first indication information and the switching delay comprised in the first information.

2. The method according to claim 1, wherein the time limit information further comprises
    a preset duration, wherein a time interval between two adjacent times of carrier switching is not allowed to be less than or equal to the preset duration.

3. The method according to claim 1, wherein the first information is further used to indicate carrier information used when selecting an uplink carrier, wherein the carrier information comprises at least one of the following:
    a state of carrier, wherein the state is an active state or an inactive state;
    a preference parameter of carrier;
    carrier identifier information for switching: or
    information about a first to-be-switched carrier indicated by a network side.

4. The method according to claim 1, wherein the first information is further used to indicate resource information used when selecting an uplink carrier, wherein the resource information comprises at least one of the following:
    a state of resource, wherein the state is an active state or an inactive state;
    a preference parameter of resource; or
    resource information corresponding to a first to-be-switched carrier indicated by a network side.

5. The method according to claim 1, wherein the first information is further used to indicate service information used when selecting an uplink carrier wherein the service information comprises a service priority corresponding to uplink data transmitted on a carrier or a resource.

6. The method according to claim 1, wherein after the determining, by the terminal device, the first uplink carrier used by the uplink data to be transmitted according to the first information, the method further comprises:
    switching, by the terminal device, from the second uplink carrier to the first uplink carrier when the first uplink carrier is different from the second uplink carrier currently used; or,
    continuing, by the terminal device, to transmit uplink data on the second uplink carrier when the first uplink carrier is the same as the second uplink carrier.

7. The method according to claim 6, wherein after the switching, by the terminal device, from the second uplink carrier to the first uplink carrier, the method further comprises:
    switching, by the terminal device, from the first uplink carrier to the second uplink carrier when the terminal device completes transmission of uplink data by using a dynamic grant (DG) resource of the first uplink carrier; or switching, by the terminal device, from the first uplink carrier to the second uplink carrier when the terminal device completes transmission of uplink data by using an effective resource of the first uplink carrier, wherein the effective resource comprises an effective DG resource and/or configured grant (CO) resource; or, switching, by the terminal device, from the first uplink carrier to the second uplink carrier when the terminal device receives third indication information, wherein the third indication information comprises information about the second uplink carrier.

8. The method according to claim 6, wherein a CG resource of the second uplink carrier is configured such that:

the CG resource of the second uplink carrier is not used or is suspended when the terminal device switches from the second uplink carrier to the first uplink carrier; and the CG resource of the second uplink carrier is available or restored when the terminal device switches from the first uplink carrier to the second uplink carrier;

or, the CG resource of the second uplink carrier is deactivated or deconfigured when the terminal device switches from the second uplink carrier to the first uplink carrier; and the CG resource of the second uplink carrier is activated or reconfigured when the terminal device switches from the first uplink carrier to the second uplink carrier.

9. The method according to claim 1, wherein before the determining the first uplink carrier used by the uplink data to be transmitted, the method further comprises:

determining, by the terminal device, the second uplink carrier currently used, according to second information; wherein the second information comprises at least one of the following:

preference parameters of resource in the NUL and the SUL, preference parameters of carrier of the NUL and the SUL, a reference signal received power (RSRP), a reference signal received quality (RSRQ), or second indication information sent by a network device; wherein the second indication information is used to indicate initial carrier information, or to indicate information about the first uplink carrier.

10. A non-transitory computer-readable storage medium, wherein the computer-readable storage medium stores computer-executable instructions, and the computer-executable instructions, when executed by a processor, are used to implement the data transmission method according to claim 1.

11. The method according to claim 1, wherein the determining, by the terminal device, whether to take the second to-be-switched carrier as the first uplink carrier according to the start time of the resource of the second to-be-switched carrier comprised in the first indication information and the switching delay comprised in the first information, comprises:

taking, by the terminal device, the second to-be-switched carrier as the first uplink carrier when a time difference between the start time of the resource of the second to-be-switched carrier and a start time of a resource of the second uplink carrier is greater than the switching delay;

or, taking, by the terminal device, the second to-be-switched carrier as the first uplink carrier when a time difference between a reception time or a solution time of the first indication information and the start time of the resource of the second to-be-switched carrier is greater than the switching delay.

12. The method according to claim 11, wherein after the taking, by the terminal device, the second to-be-switched carrier as the first uplink carrier, the method further comprises:

switching, by the terminal device, from the second uplink carrier to the first uplink carrier no later than a time moment N−K;

or, the sending, by the terminal device, the uplink data by using the first uplink carrier, comprises:

sending, by the terminal device, the uplink data by using the first uplink carrier no later than a time moment N−K; wherein N is a start time of a resource of the first uplink carrier, and K is the switching delay.

13. A data transmission method, comprising:

sending indication information; wherein the indication information is configured to indicate to a terminal device information used when a first uplink carrier is selected; wherein the first uplink carrier is a carrier of a normal uplink (NUL) or a carrier of a supplementary uplink (SUL), wherein the indication information comprises a switching delay required for the terminal device to switch from a second uplink carrier currently used to another uplink carrier of the SUL or the NUL; and receiving uplink data on the first uplink carrier;

wherein the method further comprises:

sending first indication information, wherein the first indication information comprises a start time of a resource of a second to-be-switched carrier, and the first indication information is used for determining whether to take the second to-be-switched carrier as the first uplink carrier by the terminal device.

14. A non-transitory computer-readable storage medium, wherein the computer-readable storage medium stores computer-executable instructions, and the computer-executable instructions, when executed by a processor, are used to implement the data transmission method according to claim 13.

15. A terminal device, comprising:

a processor, a memory, and an interface for communicating with another electronic device; wherein the memory stores computer-executable instructions; and the processor executes the computer-executable instructions stored in the memory to enable the processor to:

determine a first uplink carrier used by uplink data to be transmitted according to first information; wherein the first uplink carrier is a carrier of a normal uplink (NUL) or a carrier of a supplementary uplink (SUL); wherein the first information is configured to indicate time limit information used when selecting an uplink carrier, and the time limit information comprises a switching delay required for the terminal device to switch from a second uplink carrier currently used to another uplink carrier of the SUL or the NUL; and send the uplink data by using the first uplink carrier;

wherein the processor is further configured to:

control the interface to receive first indication information, wherein the first indication information comprises a start time of a resource of a second to-be-switched carrier; and determine whether to take the second to-be-switched carrier as the first uplink carrier according to the start time of the resource of the second to-be-switched carrier comprised in the first indication information and the switching delay comprised in the first information.

16. The terminal device according to claim 15, wherein each of the NUL and the SUL corresponds to a preference parameter;

wherein the preference parameter comprises a priority and/or a selection factor.

17. The terminal device according to claim 16, wherein:

respective preference parameters corresponding to the NUL and at least one SUL are the same, or, the preference parameter corresponding to the NUL is a first parameter a, while the preference parameter corresponding to each of the at least one SUL is (1−a)/n, wherein n is a number of the at least one SUL.

18. The terminal device according to claim 15, wherein both the NUL and the SUL are configured with a configured grant (CG) resource, and types of CG resources configured for the NUL and the SUL are the same or different; or, one of the NUL and the SUL is configured with a CG resource.

19. The terminal device according to claim 15, wherein the receiving module is further configured to:

receive fourth indication information, wherein the fourth indication information is used to configure whether the terminal device is allowed to switch a carrier; or receive fifth indication information, wherein the fifth indication information comprises carrier identifier information.

20. A network device, comprising:

a processor, a memory, and an interface for communicating with a terminal device; wherein the memory stores computer-executable instructions; and the processor executes the computer-executable instructions stored in the memory to cause the processor to execute the data transmission method according to claim 13.

* * * * *